United States Patent [19]

Ozaki

[11] Patent Number: 4,458,920
[45] Date of Patent: Jul. 10, 1984

[54] TENSIONLESS SEAT BELT RETRACTOR
[75] Inventor: Tadahiko Ozaki, Kosai, Japan
[73] Assignee: Fuji Kiko Kabushiki Kaisha, Tokyo, Japan
[21] Appl. No.: 319,998
[22] Filed: Nov. 10, 1981
[51] Int. Cl.³ .............................................. B65H 75/48
[52] U.S. Cl. ................................. 280/801; 242/107.6; 242/107.7; 280/807; 180/268; 180/270
[58] Field of Search ........................ 280/806, 807, 801; 242/107, 107.6, 107.7; 180/268, 270

[56] References Cited

U.S. PATENT DOCUMENTS

| | | | |
|---|---|---|---|
| 3,851,836 | 12/1974 | Sprecher | 242/107.7 |
| 4,002,311 | 1/1977 | Fisher | 242/107.7 |
| 4,023,746 | 5/1977 | Magyar | 242/107.7 |
| 4,036,322 | 7/1977 | Takada | 180/268 |
| 4,065,072 | 12/1977 | Magyar | 280/807 |
| 4,293,107 | 10/1981 | Ziv | 242/107.7 |
| 4,382,563 | 5/1983 | Morita | 180/268 |

FOREIGN PATENT DOCUMENTS 55-104445 7/1980 Japan.

Primary Examiner—Robert B. Reeves
Assistant Examiner—Dennis H. Pedder
Attorney, Agent, or Firm—Lowe, King, Price & Becker

[57] ABSTRACT

A small-sized, light-weight, low-priced tensionless seat belt retractor such that it is possible to provide a necessary, sufficient, safe slack to the driver or the passenger under a tensionless condition. The tensionless seat belt retractor according to the present invention comprises a follower and a guide disk slidably brought into contact with the flange portion of the spool and provided with a circular-arc reverse-direction follower-guide portion, a several-turn spiral follower-guide portion, and a spool locking hole, in addition to the conventional seat belt retractor. The follower and guide disk set the slack at a preset tensionless length not requiring resetting when the occupant returns from a forward leaning position.

27 Claims, 63 Drawing Figures

FIG. 2-1
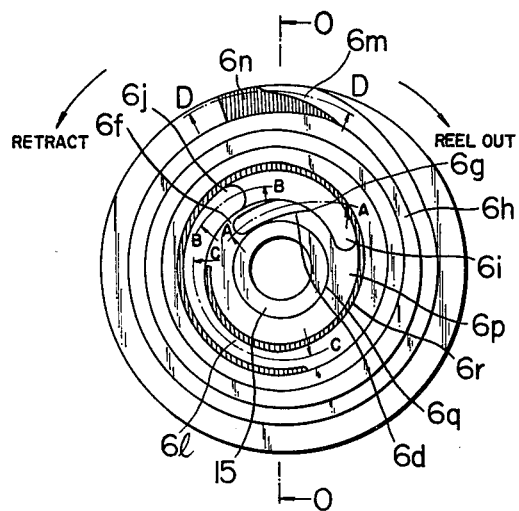
FIG. 2-2
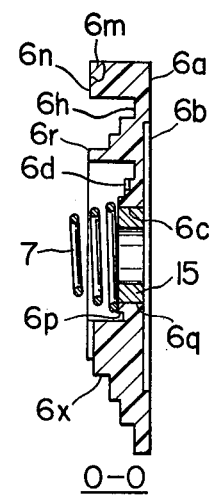
O-O
FIG. 2(A)   FIG. 2(B)
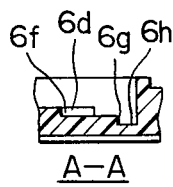   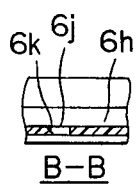   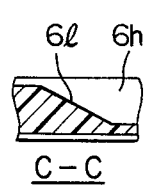   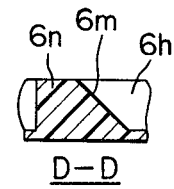
A—A     B—B     C—C     D—D
FIG. 2(C)   FIG. 2(D)

REEL OUT

BELT IS FASTENED

RETRACT

BELT IS RETRACTED A LITTLE

RETRACT

BELT IS RETRACTED UNDER TENSION

REEL OUT
STOP

BELT IS STOPPED UNDER TENSIONLESS

SPOOL OUT
RETRACT

FIG. 4-2
FIG. 4-3
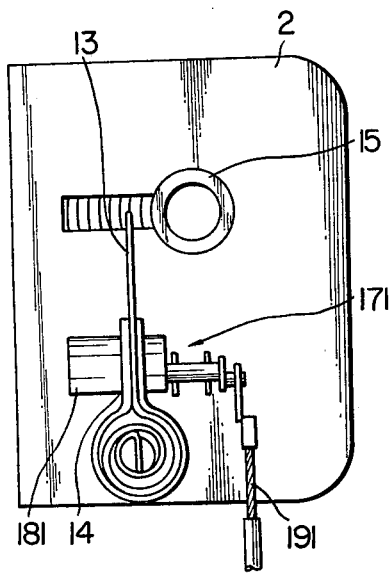
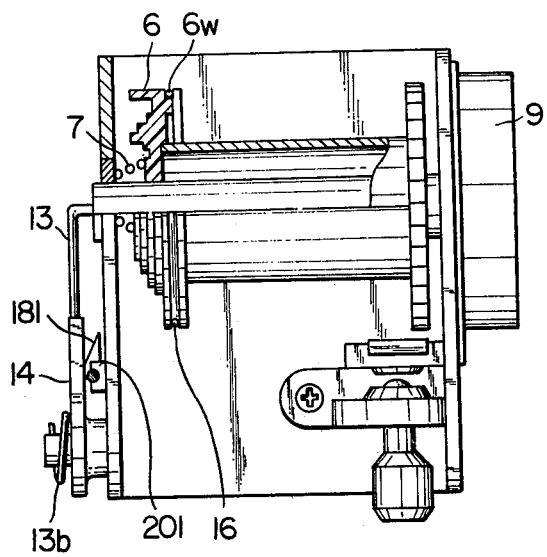

TENSIONLESS SEAT BELT RETRACTOR

BACKGROUND OF THE INVENTION

1. Field of the Invention

The present invention relates generally to a seat belt retractor used with an automotive vehicle, and more particularly to a seat belt retractor provided with a tensionless mechanism preventing the driver or passenger from feeling any tension caused by a spring used for retracting the seat belt even while fastening same.

2. Description of the Prior Art

Tension caused by a retracting spring provided in a seat belt retractor usually results in an unpleasant feeling of pressure on a vehicle occupant's chest when wearing the seat belt. To overcome this problem, a number of seat belt retractors include a mechanism to eliminate is tension.

For example, there exists a tensionless mechanism in which engagement between a buckle and a tongue is detected by a buckle switch to energize a solenoid, so that a pair of unidirectional gears engage with another gear directly fixed to the spool. Since the pair of gears can rotate in only one direction with respect to each other, the tensionless condition can be readily achieved and the belt reeled out freely in the other direction. Further, the tensionless length of the belt is determined by presetting the reeled-out length of the belt when the tongue and buckle are engaged, and it is possible to automatically prevent the belt from being further retracted unless the tensionless length of the seat belt is changed.

In the above prior-art seat belt retractor, since the belt length reeled out when the buckle is engaged the tongue is determined to be the tensionless length, there is more slack than necessary, disadvantageously permitting a secondary collision to occur between the vehicle occupant and the seat belt or the vehicle itself in an automotive vehicle collision.

In addition, it is necessary to allow the driver to lean forward easily while maintaining the preset tensionless length for when the driver returns to the normal sitting position. Furthermore, it should be easy for the seat belt user to reset the tensionless length in order to adjust it according to personal tastes and varying circumstances.

SUMMARY OF THE INVENTION

With these problems in mind, it is a primary object of the present invention to provide a seat belt retractor provided with a tensionless mechanism such that:

(1) when a buckle and a tongue engage after the driver has taken an appropriate sitting position, the belt is retracted under tension without slack, and (2) when the driver moves a little forward, a tensionless length is set. Once set, the length is not released even if the driver leans forward. That is, a constant tensionless slack is provided for the driver.

To achieve the above-mentioned objects, the tensionless seat belt retractor according to the present invention comprises a guide disk having a friction surface brought into frictional contact with a flange portion of a spool so as to be corotatable by a spool spring when no locking force is applied to the guide disk. The guide disc includes a circular-arc reverse-direction follower guide portion, a several-turn spiral follower guide portion, and a spool-locking portion. A follower travels along the follower-guide portions and is caught by the spool-locking portion to achieve a tensionless condition. A follower release means resets the follower to the original, unlocked position in response means signalling full retraction of the seat belt into the spool.

Several embodiments of the seat belt retractor according to the present invention are disclosed herein for realizing a more reliable tensionless condition. In these embodiments, the tensionless seat belt retractor according to the present invention further includes a clutch plate and a lock pawl to reliably lock the spool in the tensionless condition when the follower is caught in the spool-locking portion formed on the guide disk.

The seat belt retractor according to the present invention has the following features:

it is possible to retract the seat belt after the tongue is engaged with the buckle, while preventing a large amount of slack from being formed in the seat belt;

it is possible to predetermine a constant tensionless length of the seat belt to which the seat belt is returned even if the driver or passenger leans forward after the seat belt has been fastened properly; and it is possible to realize a small-sized, lightweight, economical tensionless seat belt retractor.

BRIEF DESCRIPTION OF THE DRAWINGS

The features and advantages of the seat belt retractor for an automotive vehicle according to the present invention will be more clearly appreciated from the following description taken in conjunction with the accompanying drawings in which like reference numerals designate corresponding elements and in which:

FIG. 1-2 is a front view of the first embodiment of the seat belt retractor according to the present invention;

FIG. 1-3 is a side view of the first embodiment of the seat belt retractor according to the present invention;

FIG. 2-1 is a front view of the guide plate used with the embodiment according to the present invention;

FIG. 2-2 is a cross-sectional view of FIG. 2-1, taken along the lines O—O;

FIG. 2(A) is a fragmentary cross-sectional view of FIG. 2-1, taken along the curve A—A;

FIG. 2(B) is a fragmentary cross-sectional view of FIG. 2-1, taken along the curve B—B;

FIG. 2(C) is a fragmentary cross-sectional view of FIG. 2-1, taken along the curve C—C;

FIG. 2(D) is a fragmentary cross-sectional view of FIG. 2-1, taken along the curve D—D;

FIG. 3-1(A) is a fragmentary front view of the guide plate of FIG. 2-1 for assistance in explaining the operation;

FIG. 3-1(B) is a fragmentary cross-sectional view of FIG. 3-1(A), taken along the curve E—E;

FIG. 3-2(A) is a fragmentary front view of the guide plate of FIG. 2-1 for assistance in explaining the operation;

FIG. 3-2(B) is a fragmentary cross-sectional view of FIG. 3-2(A), taken along the curve F—F;

FIG. 3-3(A) is a fragmentary front view of the guide plate of FIG. 2-1 for assistance in explaining the operation;

FIG. 3-3(B) is a fragmentary cross-sectional view of FIG. 3-3(A), taken along the curve G—G;

FIG. 3-4(A) is a fragmentary front view of the guide plate of FIG. 2-1 for assistance in explaining the operation;

FIG. 3-4(B) is a fragmentary cross-sectional view of FIG. 3-4(A), taken along the curve H—H;

FIG. 3-5(A) is a fragmentary front view of the guide plate of FIG. 2-1 for assistance in explaining the operation;

FIG. 3-5(B) is a fragmentary cross-sectional view of FIG. 3-5(A), taken along the curve I—I;

FIG. 3-6(A) is a fragmentary front view of the guide plate of FIG. 2-1 for assistance in explaining the operation;

FIG. 3-6(B) is a fragmentary cross-sectional view of FIG. 3-6(A), taken along the curve J—J;

FIG. 4-1 is a perspective exploded view of a second embodiment of the seat belt retractor according to the present invention;

FIG. 4-2 is a front view of the second embodiment of the seat belt retractor according to the present invention;

FIG. 4-3 is a side view of the second embodiment of the seat belt retractor according to the present invention;

FIG. 5-1 is a perspective exploded view of a third embodiment of the seat belt retractor according to the present invention;

FIG. 5-2 is a front view of the third embodiment of the seat belt retractor according to the present invention;

FIG. 5-3 is a side view of the third embodiment of the seat belt retractor according to the present invention;

FIG. 6-1 is a perspective exploded view of a fourth embodiment of the seat belt retractor according to the present invention;

FIG. 6-2 is a front view of the fourth embodiment of the seat belt retractor according to the present invention;

FIG. 6-3 is a side view of the fourth embodiment of the seat belt retractor according to the present invention;

FIG. 8-1 is a perspective exploded view of a sixth embodiment of the seat belt retractor according to the present invention;

FIG. 8-2 is a front view of the sixth embodiment of the seat belt retractor according to the present invention;

FIG. 8-3 is a side view of the sixth embodiment of the seat belt retractor according to the present invention;

FIG. 9-1 is a perspective exploded view of a seventh embodiment of the seat belt retractor according to the present invention;

FIG. 9-2 is a front view of the seventh embodiment of the seat belt retractor according to the present invention;

FIG. 10-1 is a front view of the guide plate used with the seventh embodiments according to the present invention;

FIG. 10-2 is a cross-sectional view of FIG. 10-1, taken along the lines O—O;

FIG. 11-1(A) is a fragmentary front view of the guide plate of FIG. 10-1 for assistance in explaining the operation;

FIG. 11-1(B) is a fragmentary cross-sectional view of FIG. 11-1(A), taken along the curve E—E;

FIG. 11-2(A) is a fragmentary front view of the guide plate of FIG. 10-1 for assistance in explaining the operation;

FIG. 11-2(B) is a fragmentary cross-sectional view of FIG. 11-2(A), taken along the curve F—F;

FIG. 11-3(A) is a fragmentary front view of the guide plate of FIG. 10-1 for assistance in explaining the operation;

FIG. 11-3(B) is a fragmentary cross-sectional view of FIG. 11-3(A), taken along the curve G—G;

FIG. 12-1 is a front view of the eighth embodiment of the seat belt retractor according to the present invention, in which the guide positions formed in the guide plate begin from the outer periphery thereof;

FIG. 12-2 is a side view of the eighth embodiment of FIG. 12-1;

FIG. 13-1 is a perspective exploded view of a ninth embodiment of the seat belt retractor according to the present invention;

FIG. 13-2 is a front view of the ninth embodiment of the seat belt retractor according to the present invention;

FIG. 13-3 is a side view of the ninth embodiment of the seat belt retractor according to the present invention;

FIG. 14-1(A) is a front view of the guide disk of the ninth embodiment of the seat belt retractor according to the present invention for assistance in explaining the operation;

FIG. 14-1(B) is a side view of the guide disk of FIG. 14-1(A) for assistance in explaining the operation;

FIG. 14-2(A) is a front view of the guide disk of the ninth embodiment of the seat belt retractor according to the present invention for assistance in explaining the operation;

FIG. 14-2(B) is a side view of the guide disk of FIG. 14-1(A) for assistance in explaining the operation;

FIG. 14-3(A) is a front view of the guide disk of the ninth embodiment of the seat belt retractor according to the present invention for assistance in explaining the operation;

FIG. 14-3(B) is a side view of the guide disk of FIG. 14-1(A) for assistance in explaining the operation;

FIG. 14-4(A) is a front view of the guide disk of the ninth embodiment of the seat belt retractor according to the present invention for assistance in explaining the operation;

FIG. 14-4(B) is a side view of the guide disk of FIG. 14-1(A) for assistance in explaining the operation;

DETAILED DESCRIPTION OF THE PREFERRED EMBODIMENTS

Figure 1:
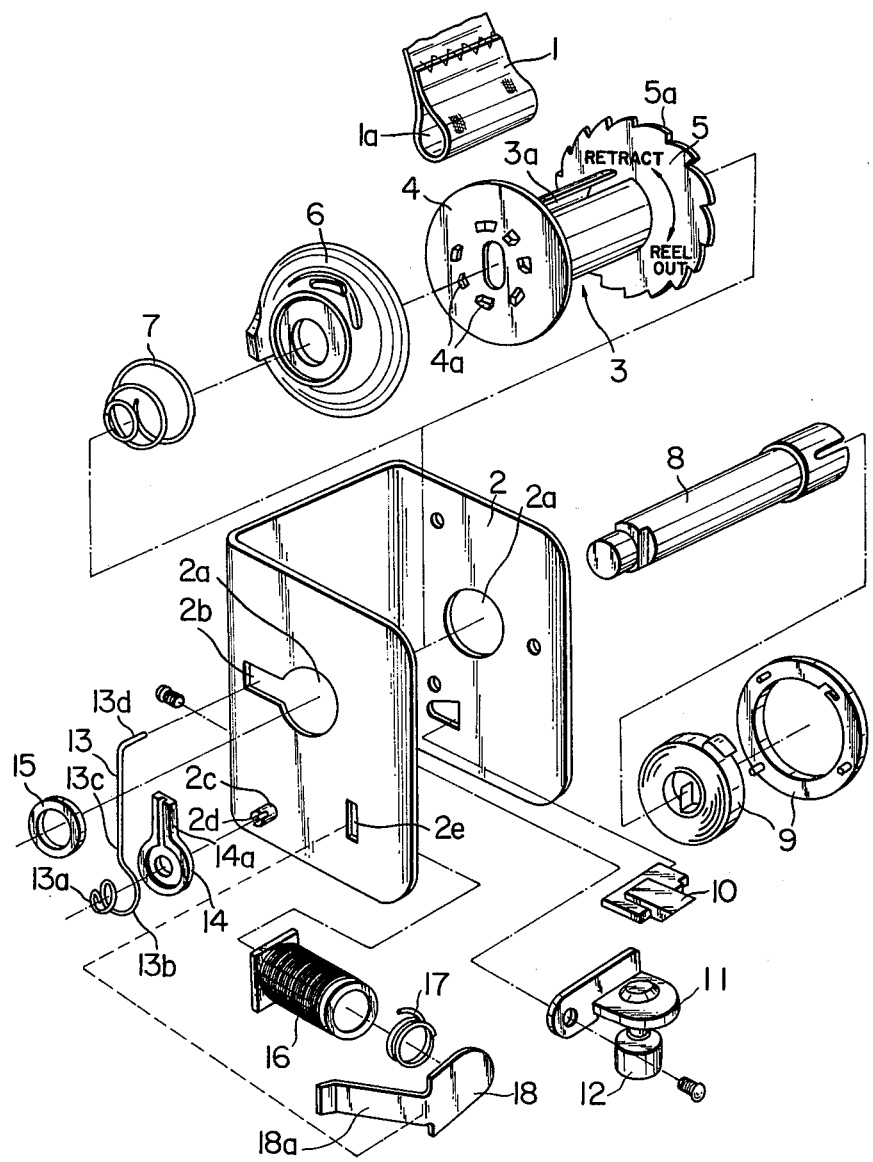
FIG. 1-1 is a perspective exploded view of a first embodiment of the seat belt retractor according to the present invention.

With reference to FIGS. 1-1, 1-2, 1-3, FIGS. 2-1, 2-2, 2(A)-(D) and FIG. 3-1(A) to FIG. 3-6(B), there is described a first embodiment of the tensionless seat belt retractor for an automotive vehicle according to the present invention.

A seat belt 1 is fixed into a spool 3 by first inserting a loop portion 1a formed at one end of the seat belt through a slot 3a of the spool and next by inserting a shaft 8 into the spool with the shaft 8 passing through the loop portion. A first flange 5 and a second flange 4 are formed integrally with spool 3 at opposite ends thereof.

In first flange 5, a first spool-locking means, such as a ratchet wheel 5a having ratchet teeth, is provided to prevent the seat belt from being further reeled out from the spool in an emergency, such as a collision.

A second spool locking member, such as plural ratchet pawls 4a formed integrally with flange 4 project from the surface thereof in the axial direction of the spool, are provided to prevent the belt from being further retracted into the retractor when a follower 13 (described after below) engages therewith. Ratchet pawls 4a are sloped on clockwise facing surfaces thereof to permit reeling out of seat belt 1 as described below.

Seat belt 1 is prevented from being further reeled out from the spool by ratchet teeth 5a, and from being further retracted into the retractor by ratchet pawls 4a.

Elastic means, such as a spool spring 9 is mounted on one side of shaft 8 to urge the spool in the retracting direction of the belt. A frame 2 is in the form of a U-shaped steel plate and includes two shaft supporting holes 2a, a follower hole 2b through which follower 13 passes to swing therein, and a follower-supporting pin 2c with a slot 2d into which the end of the follower is fitted. A bushing 15 is disposed between shaft 8 and frame 2 to reduce friction generated therebetween.

A conventional emergency lock mechanism is mounted to frame 2 on the first flange side to engage ratchet wheel 5a. A typical emergency lock mechanism includes a shock sensor (e.g., pendulum 12), a shock sensor supporter (e.g., pendulum supporter 11), and a ratchet pawl 10 engagable with ratchet wheel 5a and responsive to movement of the pendulum to prevent the belt from being further reeled out in an emergency.

When acceleration or deceleration beyond a predetermined degree is applied to the vehicle, pendulum 12 swings and pushes ratchet pawl 10 upwards to engage pawl 10 with one of ratchet teeth 5a.

Figures 1, 2:
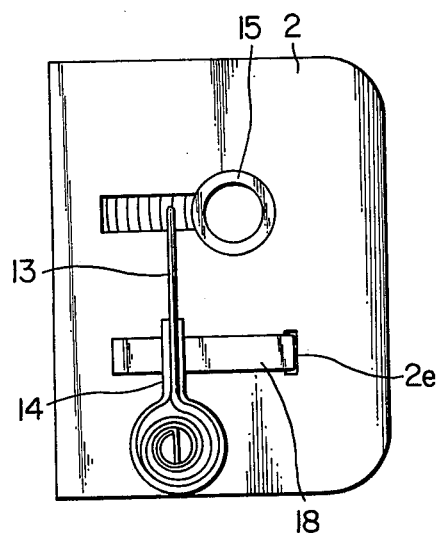

A guide disk 6 is urged into frictional contact with the surface of second flange 4 by a guide disk spring 7 disposed between frame 2 and the guide disk. Therefore, guide disk 6 can rotate with spool 3 due to frictional coupling. On the flange-side surface of guide disk 6, there is provided an annular frictional surface 6a and a circular recessed portion 6b, as shown in FIG. 2-2, having a depth (recessed height) equal to the height of ratchet pawls 4a to house the pawls therein. The opposite surface of guide disk 6 includes a central area 6p with a spring seat 6q receiving guide disk spring 7 and a counterclockwise several-turn helical-spiral follower guide portion 6h radially outside the spring seat. In addition, a circular-arc reverse-direction follower-guide portion 6d extends clockwise with an inner end 6f just radially outside of spring seat 6q. A stage 6g is provided at the intersection of reverse direction follower guide portion 6d and spiral follower-guide portion 6h. In this case, spiral follower-guide portion 6h is formed at a greater depth than reverse direction follower guide portion 6d, as depicted in FIG. 2(A). Further, in this embodiment, inner end 6f of the reverse direction follower guide portion 6d is closer to the center of guide disk 6 than inner end 6i of spiral follower-guide portion 6h, as depicted in FIG. 2-1. As depicted in FIG. 2(B), a spool-locking hole 6j is formed in spiral follower-guide portion 6h a little outside of the crossing point of reverse-direction follower-guide portion 6d and spiral follower guide portion 6h. Hole 6j is formed at the same distance away from the center of guide disk 6 as that of ratchet pawls 4a, and a sloping surface 6k is formed on edge of the hole 6j in the outward (counterclockwise) direction of spiral follower-guide portion 6h.

Travelling along spiral following guide portion 6h outward from the hole 6j, spiral follower guide portion goes up sharply on a slope 6l to the top thereof as shown in FIG. 2(C), goes down gradually through four rotations of the guide disk, and then does up sharply on slope 6m to the top 6n again as shown in FIG. 2(D). In addition, near the slope 6l, a spiral wall surface 6r is provided on both sides of the spiral follower guide portion 6h to positively guide the follower; however, subsequently, the inner wall of follower guide portion 6h is used to guide follower 13.

Follower 13 includes an end portion 13a to be fixed into a slot 2d of the pin 2c mounted on one side surface of frame 2. A spiral spring portion 13b which functions both as a torsional spring to urge follower 13 toward the center of guide disk 6 and as a compression spring to urge the follower against the surface of the guide disk. Follower 13 also includes a straight portion 13c and a follower end portion 13d to be brought into contact with the follower guide portion of guide disk 6. The spirally wound portion 13b urges follower end portion 13d in the axial direction of the spool, and more specifically in a direction to engage guide disk 6 and ratchet pawl 4a. Further, in this embodiment, follower 13 is formed by a single spring rod.

Follower supporter 14 is loosely fitted to pin 2c, and is urged contact frame 2 by the force of spiral portion 13b. Straight portion 14a of follower supporter 14 supports straight portion 13c of follower 13 to reinforce the engagement of follower end portion 13d with ratchet pawl 4a.

An electromagnet 16 is fixed to frame 2. A follower-release plate 18 is pivotably supported in a rectangular hole 2e formed in the frame so as to swing through a small angle. Arm 18a of follower-release plate 18 is sandwiched between follower supporter 14 and frame 2, and the other end is attracted to the core of the electromagnet. A spring 17 is disposed between follower-release plate 18 and electromagnet 16 so that the follower-release plate is normally urged away from the electromagnet. Upon actuation of electromagnet 16 plate 18 pivots to urge follower 13 away from guide disk 6.

Presently, the operation of the first embodiment of the seat belt retractor according to the present invention will be described.

Electromagnet 16 is kept energized from when the vehicle door is opened to when the door is closed while the driver or the passenger gets in the vehicle. Follower 13 is thereby forced outward by follower release plate 18 to disengage follower 13 from guide disk 6.

Next, when the door is closed and magnet 16 is deenergized, follower 13 is brought into contact with the outer surface of the bushing 15 by the force generated by the follower itself in the radial direction of the spool. Since the outer surface of bushing 15 is within central area 6p of guide disk 6, central area 6p constitutes the original position of the follower.

Figures 1, 2, 3:
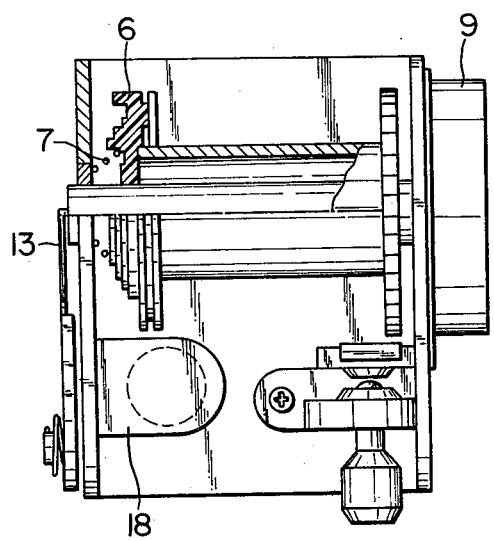
Figures 1A, 3:
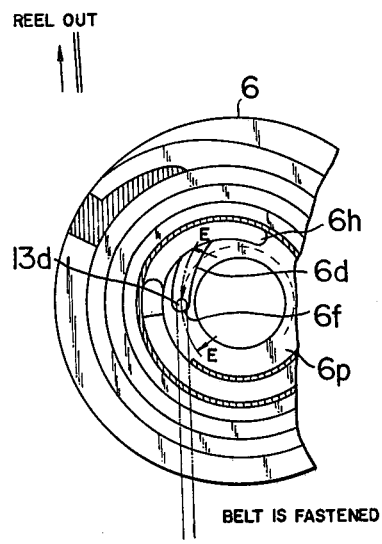

With reference to FIGS. 3-1(A) and (B), when the belt is reeled out from the spool in order to be fastened by the driver or passenger, guide disk 6 rotates clockwise in frictional contact with flange 4. In this case, however, since follower end 13d engage with inner edge 6f of reverse-direction follower guide portion 6d within one revolution (the dotted circle denotes the movement of the follower assuming the guide disk to be fixed), guide disk 6 cannot further rotate in the direction in which the seat belt is further reeled out; thereafter, the belt is reeled out with flange 4 rotating with respect to the guide disk in sliding contact therewith.

With reference to FIGS. 3-2(A) and (B), when the belt is reeled out sufficiently and a buckle (not shown) and a tongue (not shown) are engaged with each other after the driver has taken an appropriate sitting position, the belt is retracted a little by the force of spool spring 9. Spool 3 and guide disk 6 rotate together in the counterclockwise direction due to frictional contact therebetween. In this case, follower end 13d advances within reverse direction follower-guide portion 6d toward the intersection with spiral follower-guide portion 6h as shown by the dotted line F—F, and then drops from stage 6g to the spiral follower-guide portion.

Figures 1B, 3:
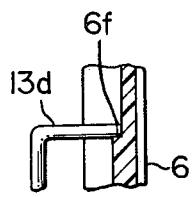
Figures 2A, 3:
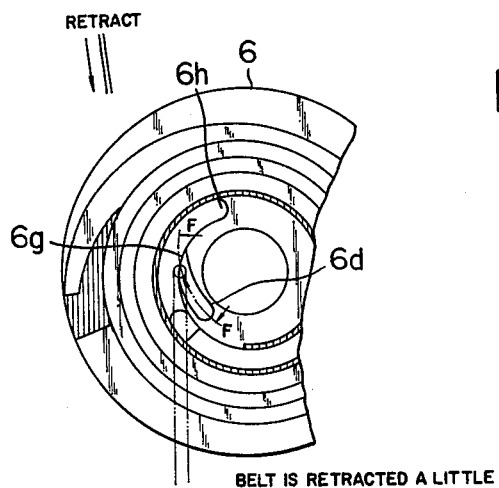
Figures 2B, 3:
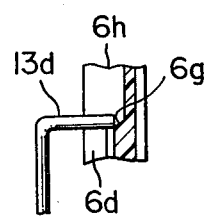
Figures 3, 3A:
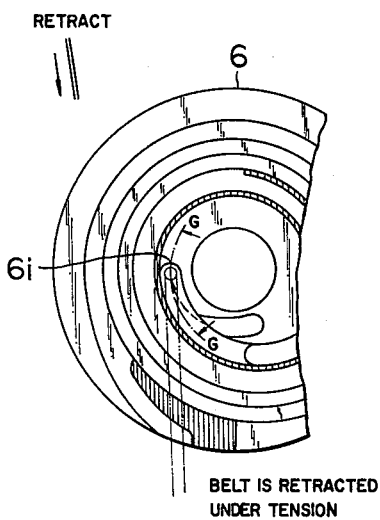

With reference to FIGS. 3-3(A) and (B), follower end 13d reaches inner end 6i of spiral follower-guide portion 6h so that guide disk 6 cannot rotate in the direction in which the belt is further retracted. Accordingly, thereafter, the belt is retracted with the flange 4 rotating slidingly with respect to guide disk 6, until the seat belt is brought closely into contact with the driver's body. In this case, tension is applied to the driver.

Figures 3, 3B:
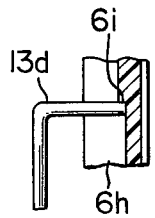
Figures 3, 4, 4A:
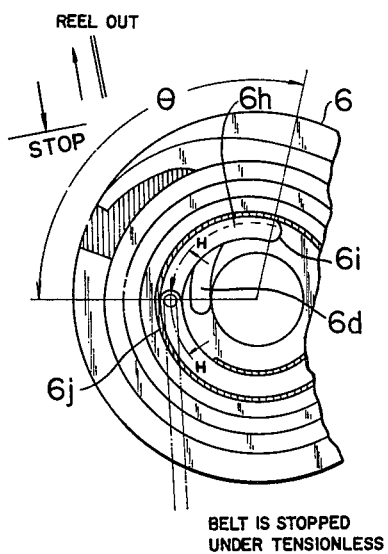

With reference to FIGS. 3-4(A) and (B), when the driver moves a little, the belt reels out slightly and follower end 13d moves counterclockwise within the spiral follower-guide portion 6h, passing through the intersection with reverse-direction follower-guide portion 6d, and reaches hole 6j (in this case, the follower cannot move from the spiral follower-guide portion to the reverse-direction follower-guide portion due to stage 6g, i.e., because of a height difference between the two).

Figures 3, 4, 4B:
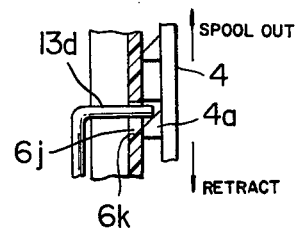
Figures 3, 4, 5, 5A:
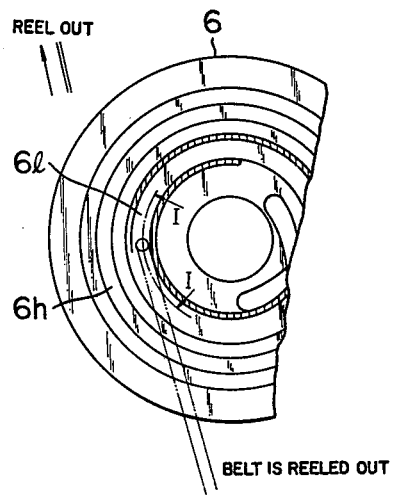
Figures 3, 4, 5, 5B:
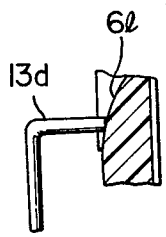
Figures 3, 4, 5, 6, 6A:
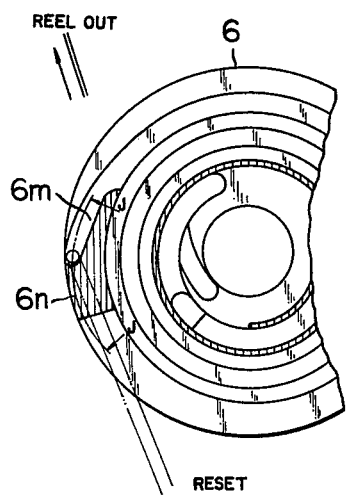
Figures 3, 4, 5, 6, 6B:
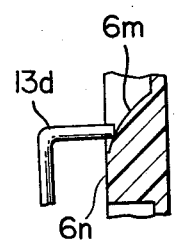
Figures 1, 4:
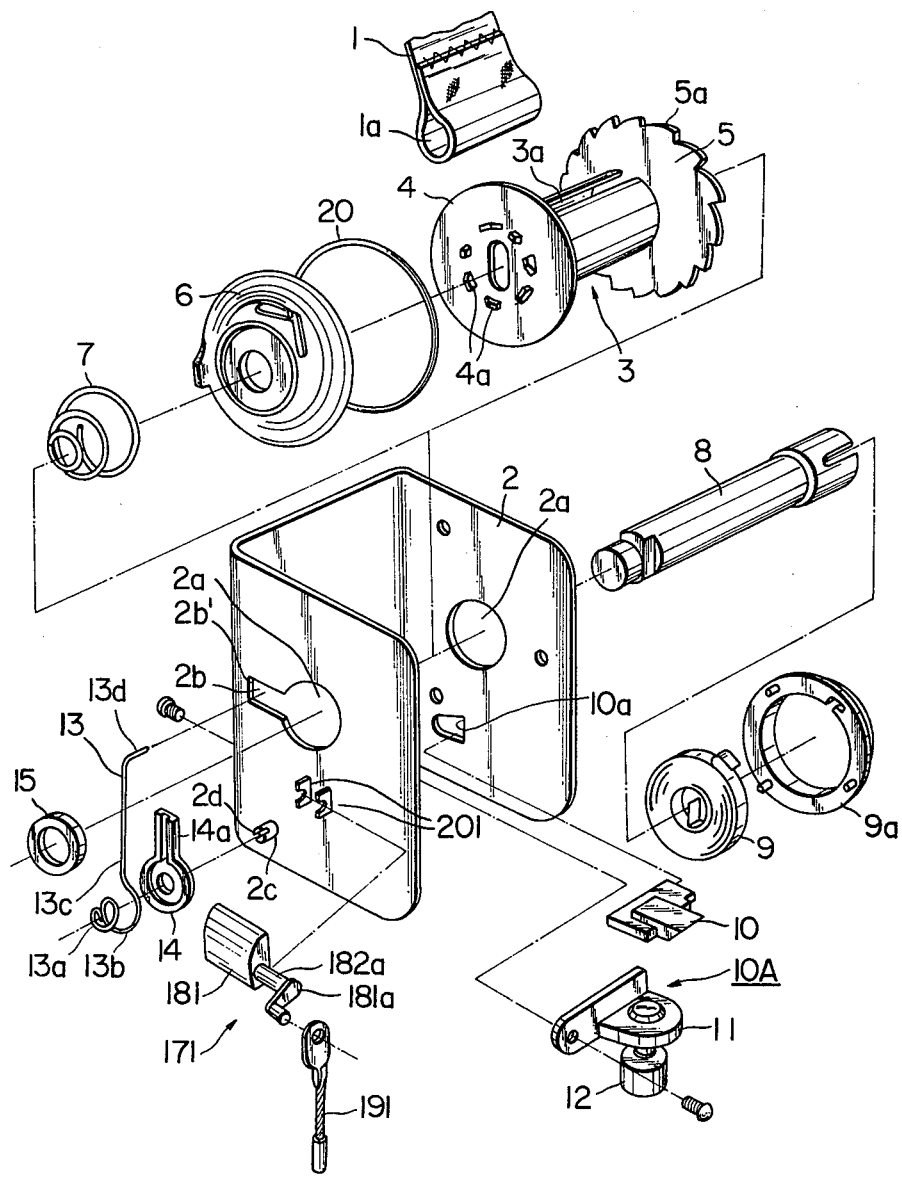
Figures 1, 5:
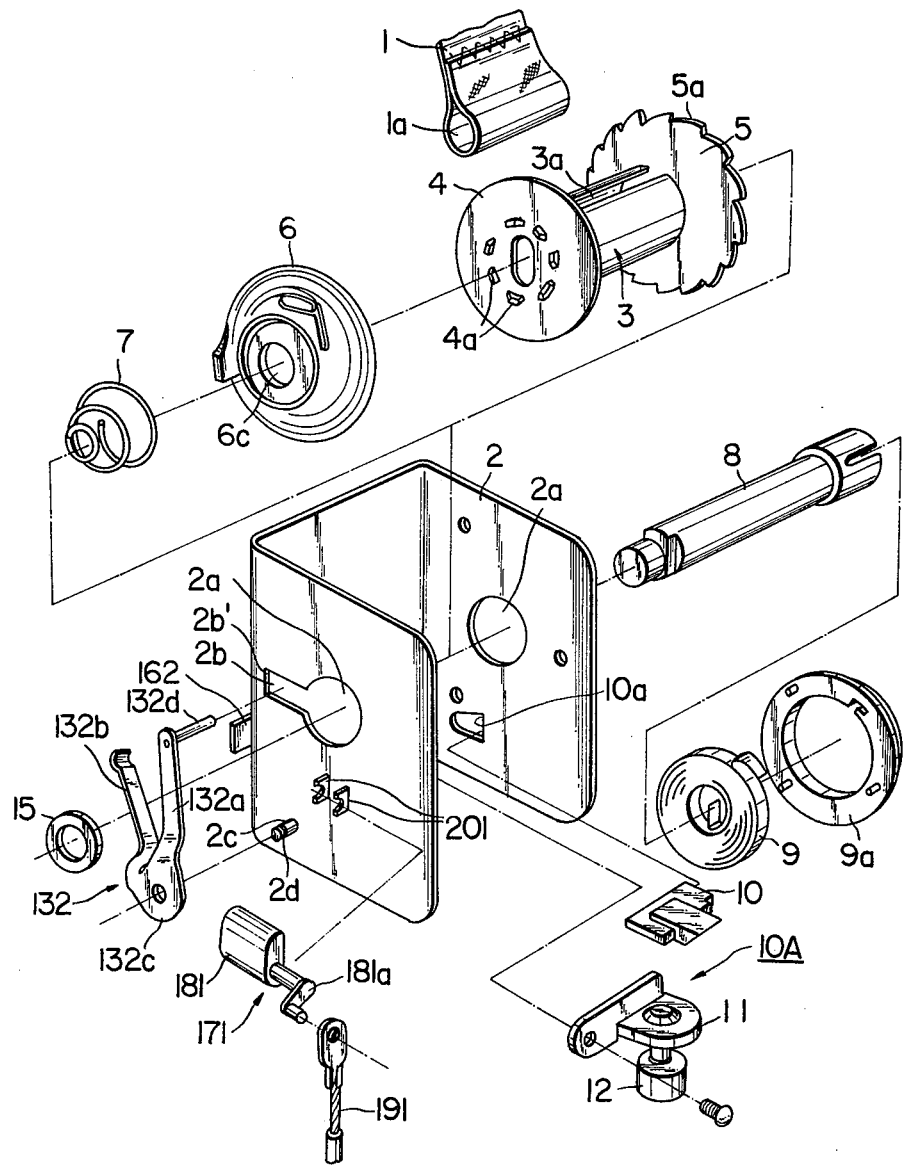
Figures 2, 5:
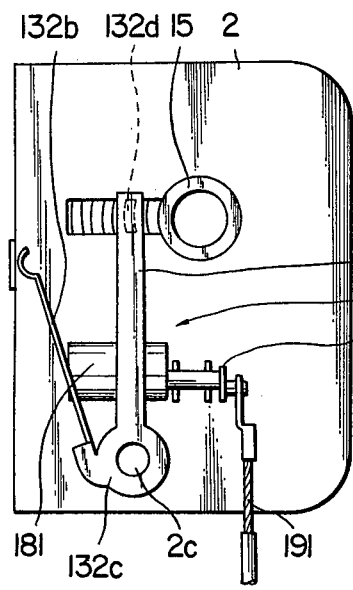
Figures 3, 5:
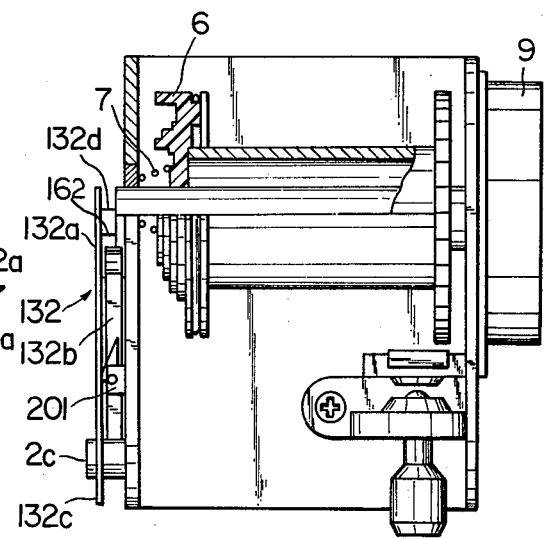
Figures 1, 6:
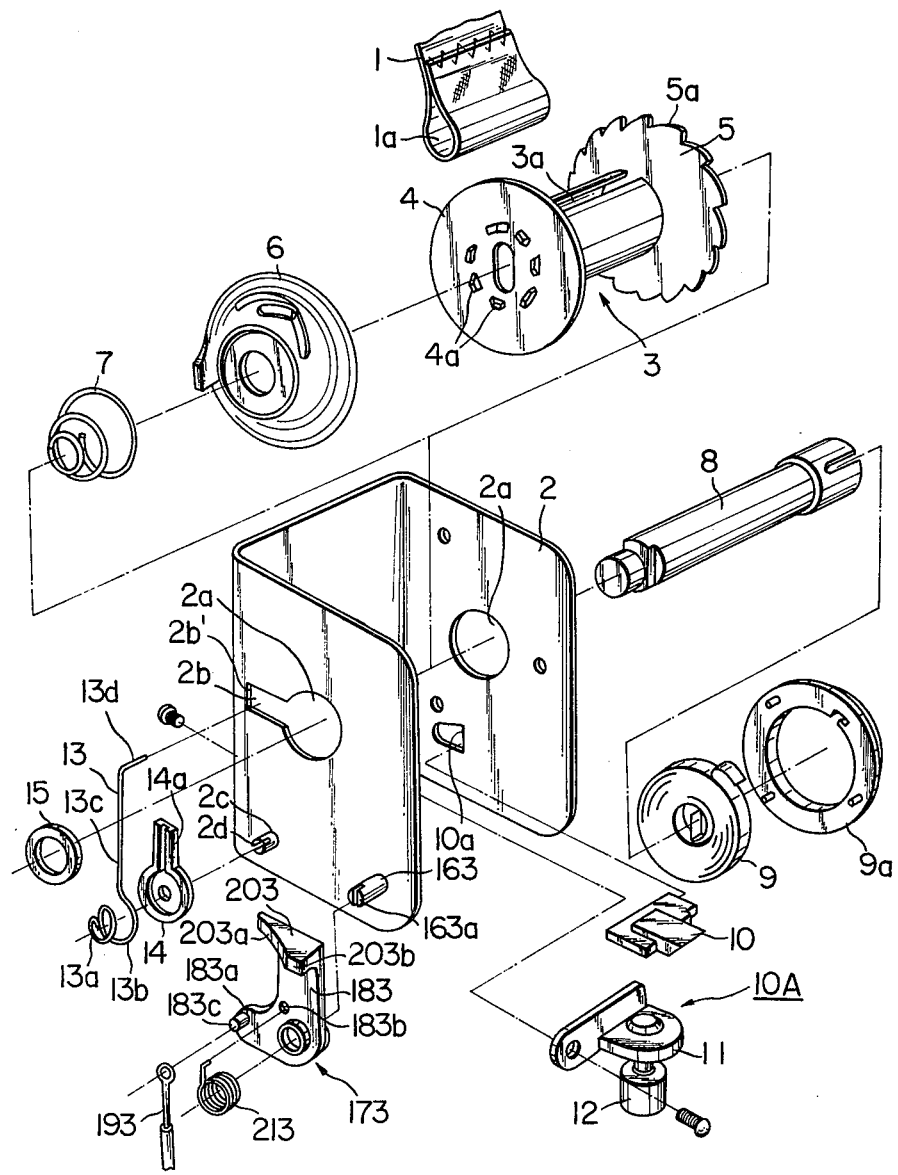
Figures 2, 6:
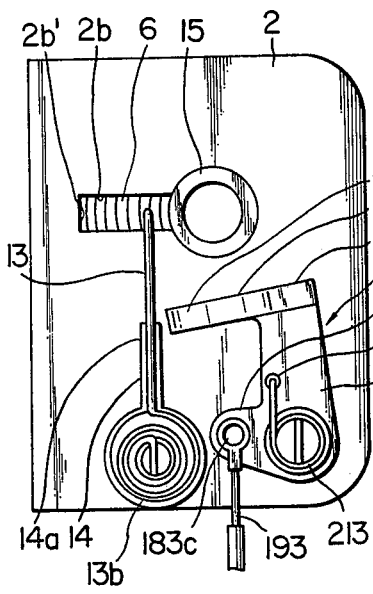
Figures 3, 6:
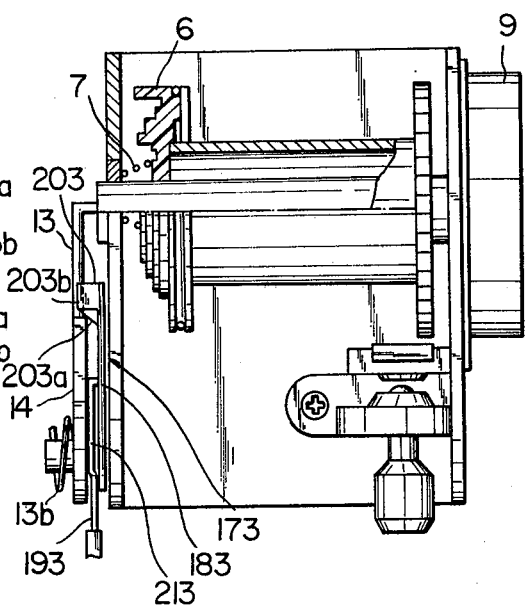

As depicted in FIG. 3-4(B), follower end portion 13d drops into hole 6j by the force caused by spiral portion 13b to engage with one of ratchet pawls 4a formed in flange 4, so that spool 3 cannot rotate in the direction in which the belt is further retracted, i.e., the spool becomes locked, thus attaining a tensionless condition. Thus, belt 1 has some degree of slack (a tensionless length) commensurate with angle θ from inner edge 6i of spiral follower-guide portion 6h to hole 6j. However, it should be understood that the slack length tends to vary because of the uncertain distance between hole 6j and pawl 4a (i.e., since guide disk 6 and flange 4 also move relative to each other, the pawl-to-hole distance is always unknown).

With reference to FIGS. 3-4(A) and (B) and FIGS. 3-5(A) and (B), when the driver or passenger fastening the seat belt leans forward for some reason, causing guide disk 6 to rotate with flange 4 (reeled-out direction in FIG. 3-4(B)), follower end 13d moves up along the slope of one of ratchet pawls 4a and next moves up along slope 6k of hole 6j, thus escaping from the hole. Thereafter, end 13d moves outward along spiral follower-guide portion 6h for up to several revolutions of guide disk 6.

When the driver or passenger returns from the forward position to the normal sitting position, belt 1 retracts, cuasing follower end portion 13d to return back along spiral follower-guide portion 6h and drop back in hole 6j into engagement with ratchet pawl 4a, again attaining a tensionless condition. During this period, since guide disk 6 does not slide because follower end 13d is not lockably engaged with any abutments on the guide disk, the belt is not further retracted keeping the tensionless length preset under the initial tensionless condition.

Furthermore, in this embodiment, the length of the belt which can be further reeled out without releasing the preset tensionless length after it has been preset, depends upon the number of turns of spiral follower-guide portion 6h. In this embodiment, the number is preset to about four revolutions since that value is considered to be sufficient for practical use.

With reference to FIGS. 3-6(A) and (B), when the guide disk rotates for more than four revolutions for some special reason, follower end 13d moves up along slope 6m to top portion 6n provided at the end of spiral follower-guide portion 6h. The restriction due to guide portion 6h being released, follower end 13d is reset or returned to central area 6p of the guide disk, i.e, to the original position, with a 'click' sound.

In addition, when normally unfastening the seat belt, i.e., the tongue is disengaged from the buckle, it is expected that follower end 13d is still within hole 6h in engagement with ratchet pawl 4a, i.e., in a tensionless condition. In this state, when the driver or passenger opens the door, the door switch energizes electromagnet 16, causing follower-release plate 18 to move follower 13 outward, releasing engagement with guide disk 6. Follower 13 is thereby reset to the original position within central area 6p on guide disk 6 by the force of spiral spring portion 13b with a 'click' sound.

In summary, follower 13 functions as follows:

(1) when the door is opened and the electromagnet is energized, follower 13 is disengaged from guide disk 6, (2) when the door is closed and the magnet is deenergized, follower 13 is reset to original position 6p by follower spring 13, (3) when the belt is reeled out from the spool in order to be fastened by the driver, guide disk 6 rotates clockwise in frictional contact with flange 4. Follower 13 is engaged with edge 6f of the reverse-direction follower-guide portion 6d. Thereafter, the belt is reeled out under sliding contact between flange 4 and guide disk 6 (See FIGS. 3-1(A) and (B)), (4) when the belt has been fastened and is retracted a little by spool spring 9, guide disk 6 rotates counterclockwise together with spool 3; follower end 13d drops from stage 6g to spiral follower-guide portion 6h (See FIGS. 3-2(A) and (B)), (5) when follower end 13d reaches end 6i, guide disk 6 is fixed, but the belt is retracted under sliding contact of the spool with the guide disk, so that tension is applied to the driver (See FIGS. 3-3(A) and (B)), and (6) when the driver moves forward a little, the belt slightly reels out, and guide disk 6 rotates clockwise to drop follower end 13d through the hole 6j. End 13d engages with ratchet pawl 4a to prevent the belt from being retracted further, thus realizing a tensionless condition with a tensionless slack length commensurate with an angle θ between end 6i and hole 6j and the variable distance between hole 6j and panel 4a (See FIGS. 3-4(A) and (B)), (7) when the driver leans further forward, follower end 13d moves up along the slope of the ratchet pawl and next along the slope of hole 6j, thus moving outward along spiral portion 6h (See FIGS. 3-4(A) and (B)), (8) when the driver returns to the normal position, the belt is retracted again, the follower 13 drops into the hole 6j, thus realizing a tensionless condition again (See FIG. 3-5(A)), (9) when the belt is reeled out further and guide disk 6 rotates through more than four revolutions, the follower moves up along slope 6m to top 6n and is reset to the original position. (See FIGS. 3-6(A) and (B))

With reference to FIGS. 4-1, 4-2, and 4-3, there is described the second embodiment of the tensionless seat belt retractor according to the present invention.

An O-ring member 20 made of a material having a high coefficient of friction, such as rubber or, is disposed between guide disk 6 and flange portion 4 of the spool. O-ring 20 is fitted into a groove 6W formed in the outer periphery of guide disk 6 as shown in FIG. 4-3, improving frictional contact or the engagement force of the guide disk with flange 4.

Additionally, follower-release means 171 of the second embodiment comprises an airfoil-shaped actuator 181 rotatably supported by a supports 201 fixed to the side wall of frame 2, and a cable 191 to actuate the actuator in conjunction with, for example, opening or closing of the vehicle door (not shown). Actuator 181 has a roughly arc-shaped cam surface disposed under the straight portion 14a of follower supporter 14. Cable 191 is connected to a lever 181a fixed to a shaft 182a of actuator 181. When the door open, actuator 181 is rotated counterclockwise by cable 191 so that follower end 13d moves away from guide disk 6 together with follower supporter 14 against the force of spring 13b.

With reference to FIGS. 5-1, 5-2, and 5-3, there is described the third embodiment of the tensionless seat belt retractor according to the present invention.

Follower 132 of the third embodiment comprises a follower rod 132d which moves along spiral follower-guide portion 6h formed in guide disk 6. A first leaf spring 132a urges follower rod 132d in the axial direction of spool 3, i.e., toward the surface of spiral follower-guide portion 6h. A second leaf spring 132b formed integrally with first leaf spring 132a branches off from a base portion 132c thereof to urge follower rod 132d in the radial direction of spool 3, i.e., toward the center of the guide disk. In this case, the second leaf spring 132b is brought into contact with a seat portion 162 projecting from frame 2. Base portion 132c of first leaf spring 132a is pivotably fitted to a circular groove 2d formed at the end portion of support pin 2c.

Additionally, follower rod 132d is designed to be of sufficient strength to overcome the rotational force generated by the spool spring to retract the belt in tensionless condition; however, in this case, the strength must be small enough not to urge the follower rod beyond the groove or wall of spiral follower-guide portion 6h.

In this embodiment, therefore, it is possible to design each leaf spring independently so as to provide an appropriate elasticity for each, and additionally to design the follower rod to have a sufficient strength. As a result, it is possible to use a small-sized, light-weight actuator to release the follower.

With reference to FIGS. 6-1, 6-2, and 6-3 there is described a fourth embodiment of the tensionless seat belt retractor according to the present invention.

Follower release means 173 of the fourth embodiment comprises a release lever 183 rotatably supported by a support pin 163 fixed on the side wall of frame 2 and a cable 193 actuating the release lever. Release lever 183 includes an integrally-formed wedge-like cam portion 203 having a sloped surface 203a operable to gradually separate follower 13 from frame 2. Cam 203 is disposed between the back surface of the arm portion 14a of follower supporter 14 and the side wall of the frame. Release lever 183 is urged clockwise by a helical spring 213, one end of which is fitted into a slot 163a of supporter pin 163 and the other end of which is fitted into a small hole 183b formed in the release lever. Cable 193 is connected to a pin 183c fixed to arm portion 183a on one side of the release lever 183. When cable 193 is pulled, release lever 183 rotates counterclockwise in FIGS. 6-1 and 6-2. Cable 193 is pulled in conjunction with, for example, the opening and closing of a vehicle door (not shown).

In this embodiment, therefore, it is possible to release follower 13 with a relatively small force. As a result, a small-sized, light-weight actuator can be used.

Figure 7:
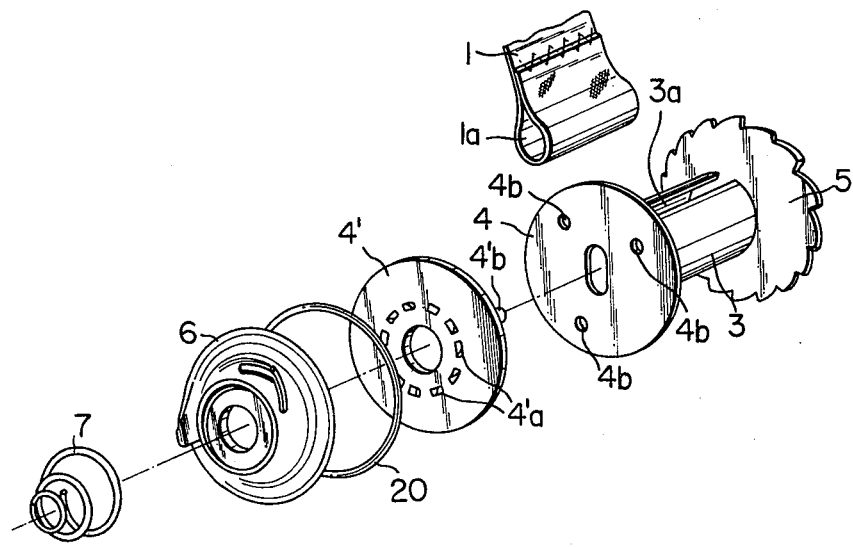
FIG. 7 is a perspective exploded view of the part of a fifth embodiment of the seat belt retractor according to the present invention, in which the ratchet teeth are formed being recessed in the flange of the spool and an O-ring member is additionally provided therefore.

FIG. 7 shows a fifth embodiment of the seat belt retractor according to the present invention. In this embodiment, an additional disk 4' having the same diameter as that of flange 4 is used. Disk 4' is attached to flange 4 with three pins 4'b fixed on the back surface of the disk inserted into three holes 4b formed in the flange. In disk 4', a second spool locking member such as ratchet pawls 4'a, formed integrally with the second disk and being recessed from the surface thereof in the axial direction of the spool, are provided to prevent the belt from being further retracted into the retractor when follower 13 is engaged therewith.

Figure 7A:
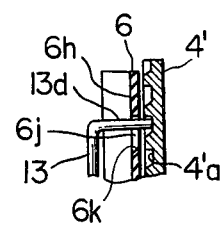
FIG. 7(A) is a fragmentary cross-sectional view of the guide disk of the fifth embodiment, in which the follower engages with the ratchet tooth formed in a disk.
Figures 1, 8:
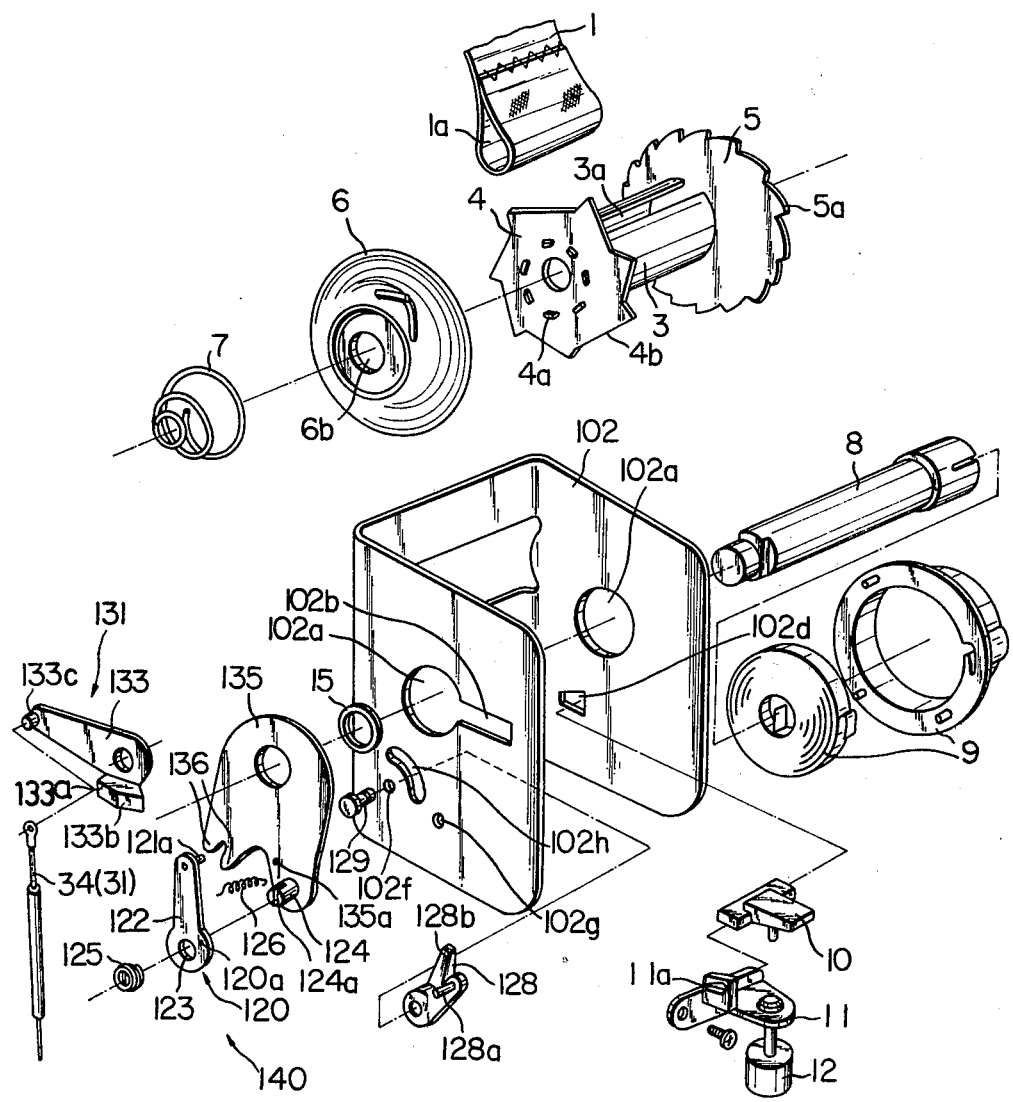
Figures 2, 8:
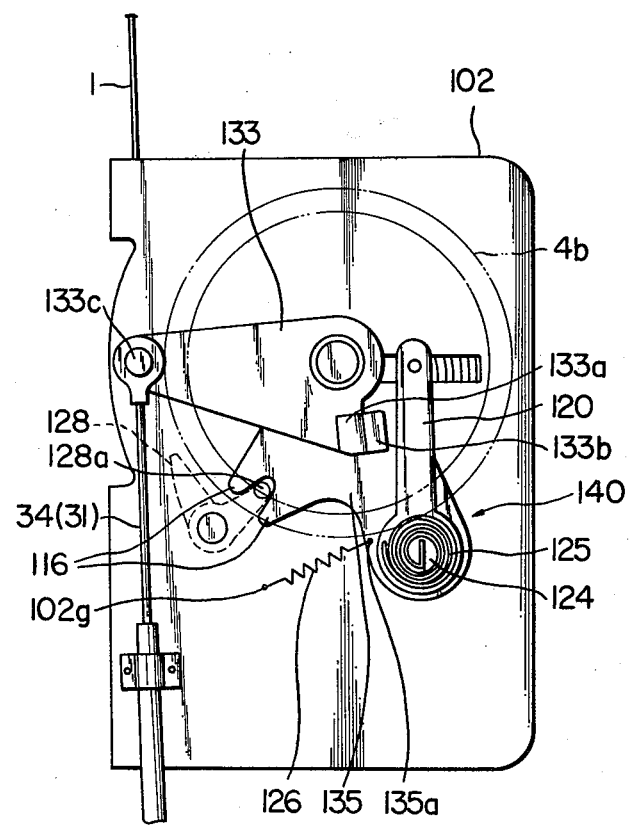
Figures 3, 8:
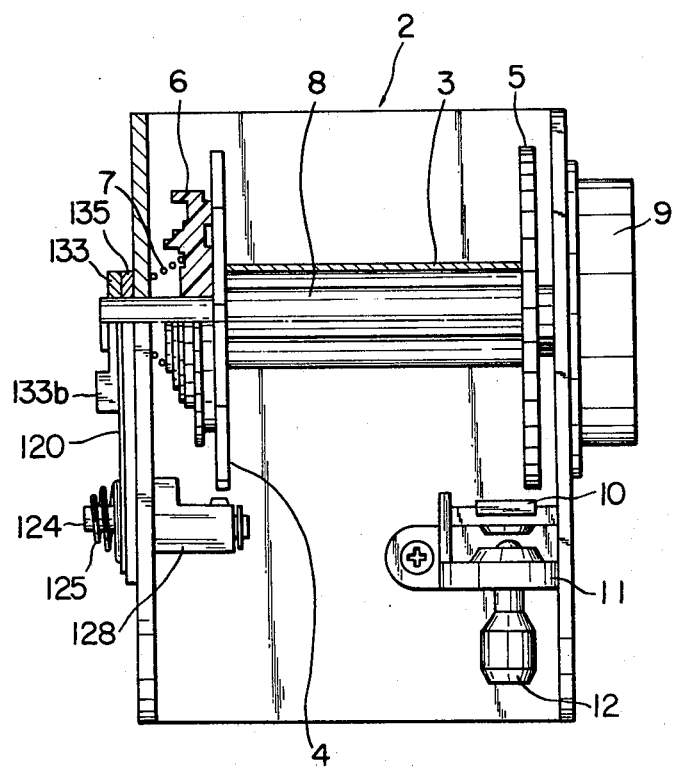

In this embodiment, as depicted in FIG. 7(A), since there is no recessed portion 6b as in the first embodiment shown in FIG. 2-2, guide disk 6 can be brought into sliding-contact with second disk 4' throughout the surface thereof, and therefore, it is possible to obtain better sliding contact between the guide disk and the second disk i.e., between the guide disk 6 and the flange 4 of the spool 3.

FIGS. 8-1, 8-2, and 8-3 show a sixth embodiment of the seat belt retractor according to the present invention. In the above-mentioned embodiments, spool 3 is locked only by engagement of the follower with the ratchet pawls. However, in the sixth embodiment, there is additionally provided a clutch plate 135, a lock pawl 128, and ratchet teeth 4b formed in second flange 4, so that a more reliable tensionless condition can be achieved.

In second flange 4, ratchet pawls 4a formed integrally therewith are recessed in the axial direction of the spool to prevent further retraction of the belt into the retractor when follower rod 121a is engaged therewith. In this embodiment, ratchet teeth 4b corresponding in number to that of ratchet pawls 4a are formed in flange 4 to prevent further retraction of the belt.

Clutch plate 135, supported by shaft 8 so as to rotate freely with respect thereto, includes a bifurcated projection 136 and a pin 124 provided with a slot 124a through the axis thereof. The clutch plate 135 is urged clockwise by a helical spring 126 supported by a hole 102g formed in frame 102 and another hole 135a formed in the clutch plate.

Follower 120 includes a follower rod 121a and a follower plate or arm 122. A hole 123 in follower plate 122 is rotatably fitted onto pin 124 so that rod 121a passes through a slot 102b in the wall of frame 102 to contact guide disk 6. The follower is urged counterclockwise toward the center of the guide disk by a spiral spring 125 supported by slot 124a of pin 124 and a second hole 120a formed in follower plate 122.

Lock pawl 128 is rotatably supported between the walls of frame 102 by a pin 129 fixed on the frame side wall. The lock pawl 128 has a projection 128b engagable with ratchet teeth 4b and a pin 128a engagable with bifurcated projection 136 of clutch plate 135. Further, in this case, the engagement of lock pawl 128 with a ratchet tooth 4b is designed to be directional; accordingly, the engagement is readily released when an external force is applied in the direction of reeling the seat belt out.

The follower release means 131 is supported by shaft 8 so as to be freely rotatable with respect thereto. The follower release means 131 has a pin 133c at the end of a lever arm 133 to which a cable 34 is connected and a cam slope 133b of the cam portion 133a to move the follower outward when the cable 34 rotates the follower release means 131 counterclockwise. The follower release means is disposed between follower 120 and clutch plate 135.

Next follows a description of the operation of the sixth embodiment. In the same way as in the other embodiments previously described, when the driver leans forward a little and therefore the guide disk 6 rotates clockwise, the follower rod 121a drops into the spool-locking hole 6j in FIG. 3-4(B). As a result, the follower rod 121a engages with ratchet pawl 4a to prevent the belt from being further retracted, thus realizing a tensionless condition. In this embodiment, however, when the seat belt is being retracted, follower 120 is rotated counterclockwise together with clutch plate 135 due to the force applied by spool spring 9 in frictional contact with spool 3. Accordingly, lock pawl 128 also rotates clockwise about the axis thereof, because pin 128a of the lock pawl is engaged with bifurcated projection 136 of clutch plate 135. As a result, pin 128b engaes one of ratchet teeth 4b, more reliably preventing the belt from being further retracted than in the case where the spool is stopped only by engagement of follower rod 121a with ratchet pawl 4a.

Figures 1, 9:
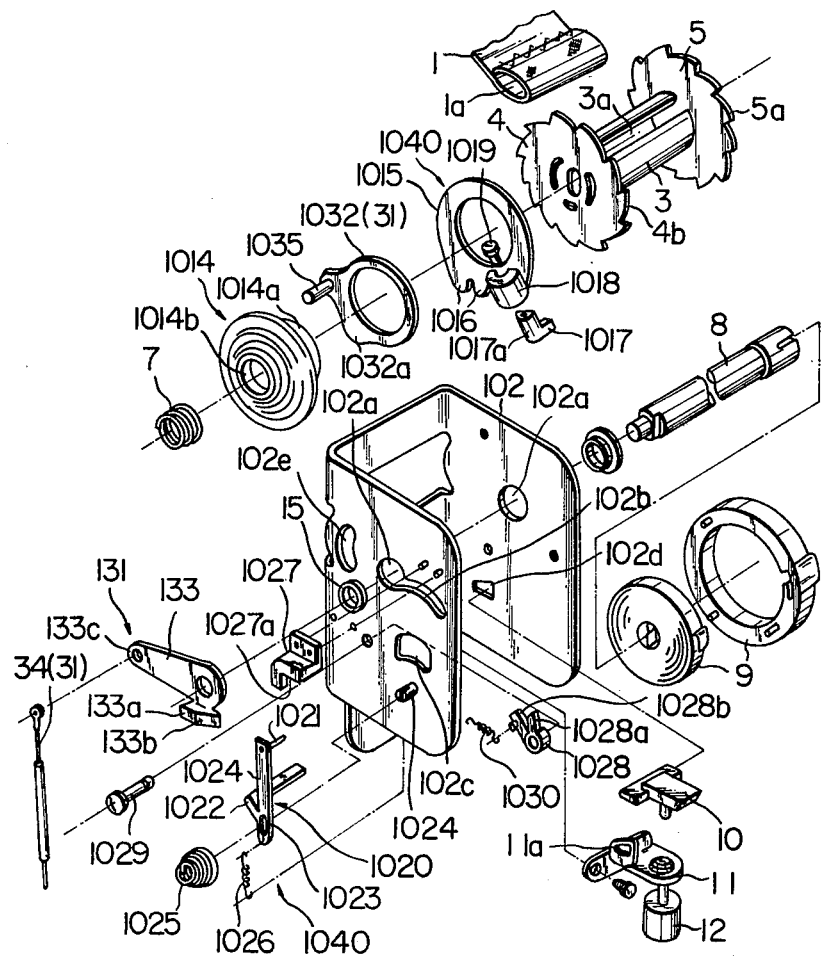
Figures 2, 9:
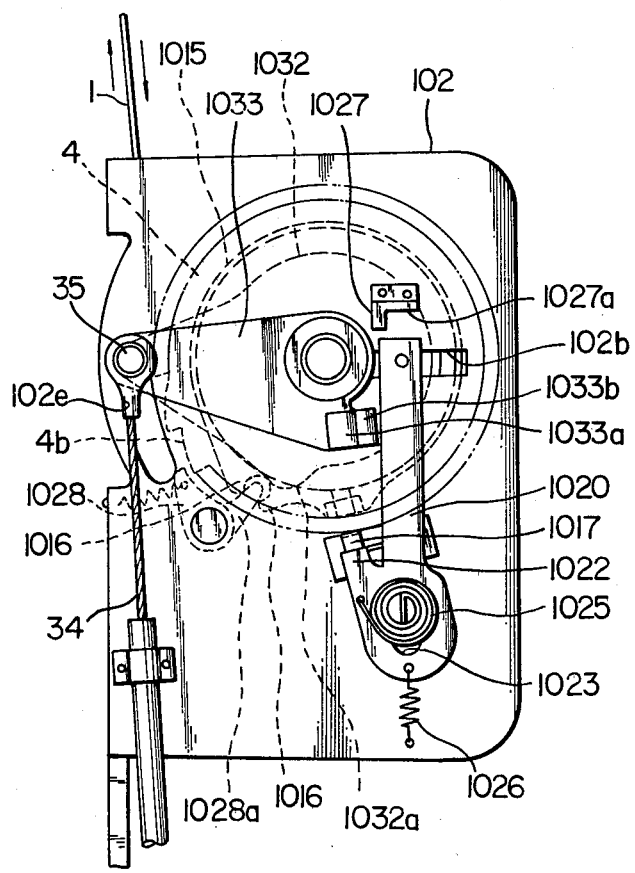

FIGS. 9-1, and 9-2, show a seventh embodiment of the seat belt retractor according to the present invention. This embodiment additionally includes a cam ring 1032, a pawl 1017 mounted on clutch plate 1015, and a follower stopper 1027.

Guide disk 1014 of the seventh embodiment differs from guide disk 6 of the first embodiment in two ways: first, a raised boss portion 1014b is provided around shaft hole 1014a on the flange-side surface; second, hole 6j of the first embodiment is replaced by a recessed portion 1014j in the seventh embodiment. The latter difference means that the follower cannot be used to engage ratchet pawls as in the first embodiment. However, this function is performed by the tensionless means described below.

A clutch plate 1015 functioning as a part of the tensionless means 1040 is formed roughly into a ring shape and is rotatably fitted onto shaft 8 against the back surface of guide disk 1014. At one part of the periphery of clutch plate 1015, there is formed a bifurcated projection 1016 which can engage first projection 1028a of lock pawl 1028. Additionally, a pawl 1017 is mounted on clutch plate 1015 facing ratchet teeth 106a of spool 103. Pawl 1017, functioning as a part of tensionless means 1040, extends toward ratchet wheel 4b over the outer circumference of clutch plate 1015 to engage the ratchet wheel. The semicircular portion 1017a of pawl 1017 is inserted into a semicircular hole of a pawl holder 1018 formed integrally with clutch plate 1015 and is held within the semicircular hole by a pawl-holding member 1019.

A follower 1020 comprises a follower plate 1023, a follower rod 1021 fixed at the top thereof, and an arm portion 1022 formed integrally with the follower plate to hold pawl 1017 with the bottom surface of the pawl in contact with arm portion 1022. The base of follower plate 1023 has a vertically-aligned slot receiving a pin 1024 fixed to the side wall of frame 102 so that follower 1020 can shift up and down. The follower can also rotate about pin 1024, and is urged counterclockwise toward the center of guide disk 1014 by a conical spring 1025 and downward by a helical spring 1026.

An L-shaped follower stopper 1027 is fixed to frame 102 at a position near the top end of follower 1020. Before follower rod 1021 drops from inner end 1014f of spiral follower-guide portion 1014e to the spool-locking portion 1014j, the top end of the follower contacts the bottom end of stopper 1027 and is prevented thereby from moving upwards; however, once the follower rod drops into spool locking portion 1014j, the top end of the follower is offset axially inward from the bottom end of stopper 1027 so that the follower can move upwards. Further, in this case, a cutout portion 1027a is provided in stopper 1027 so that the top end of the follower 1020 moves axially outward and goes up the slope of follower-guide portion 1014e, without being blocked by stopper 1027 after the follower rod drops into spool locking portion 1014j.

A lock pawl 1028 rotatably supported by a pin 1029 fixed to frame 102 has an integrally-formed first projection 1028a to engage bifurcated projection 1016 formed in clutch plate 1015 and an integrally-formed second projection portion 1028b to engage ratchet teeth 4b. Lock pawl 1028 rotates clockwise when clutch plate 1015 rotates counterclockwise because first projection 1028a is engaged with bifurcated projection 1016 of clutch plate 1015.

Further, lock pawl 1028 is urged counterclockwise by a helical spring 1030. Second projection 1028b has a rounded end so that lock pawl 1028 can easily be disengaged from ratchet teeth 4b when pawl 1017 disengages from the ratchet teeth 4b.

The follower release means (31) includes a cam plate 1032 to release pawl 1017 from engagement with ratchet teeth 4b, a release lever 133 to release engagement of follower 1020 with spool-locking portion 1014j in spiral follower-guide portion 1014e, and a cable 34 to actuate release lever 133.

Cam ring 1032 is disposed on shaft 8 between guide disk 1014 and clutch plate 1015. Cam ring 1032 has a cam profile 1032a operable to push pawl 1017 downward when the cam profile contacts pawl-holding member 1019.

Release lever 133 is rotatably supported at one end of spool shaft 8 and has a cam portion 133a with a slope 1033b to urge follower 1020 axially outward when inserted between the follower and the side wall of frame 102 as explained in the description of the sixth embodiment.

The cam ring 1032 and release lever 133 are linked to each other by a connecting pin 1035 fixed to the cam ring. Pin 1035 passess through arcuate hole 102e formed in the side wall of frame 102 and is received in a hole 133c formed in release lever 133.

Cable 34 an be pinned to hole 133c to actuate release lever 133 and cam ring 1032 when the vehicle door is opened.

Next, there is described the operation of the seventh embodiment of the seat belt retractor according to the present invention.

The cable 34 is pulled down whenever the door is opened, for example, while the driver or passenger enters the vehicle. Therefore, in this case the follower 1020 is forced outward by the follower release lever 33 to disengage follower rod 1021 from guide disk 1014.

Figures 1, 10:
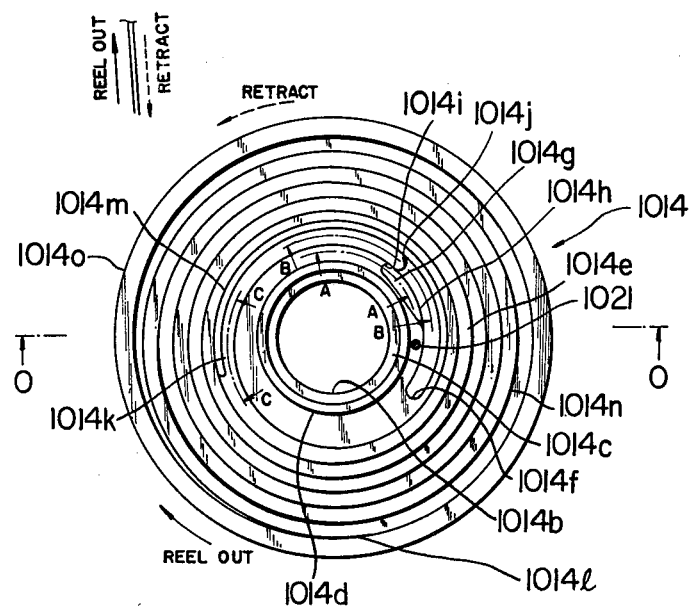
Figures 2, 10:
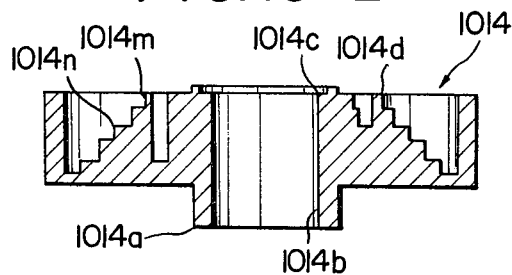
Figures 10A, 10B, 10C:
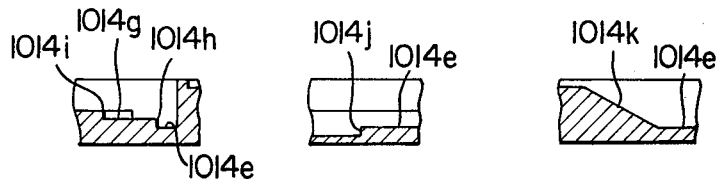
FIG. 10(A) is a fragmentary cross-sectional view of FIG. 10-1, taken along the curve A—A.
FIG. 10(B) is a fragmentary cross-sectional view of FIG. 10-1, taken along the curve B—B.
FIG. 10(C) is a fragmentary cross-sectional view of FIG. 10-1, taken along the curve C—C.

When the door is closed, follower rod 1021 is brought into contact with inner circular edge 1014d of guide disk 1014 by the force generated by the conical spring 1025 in the axial and radial direction of the guide disk as depicted in FIGS. 10-1 and 10-2.

Figures 1A, 11:
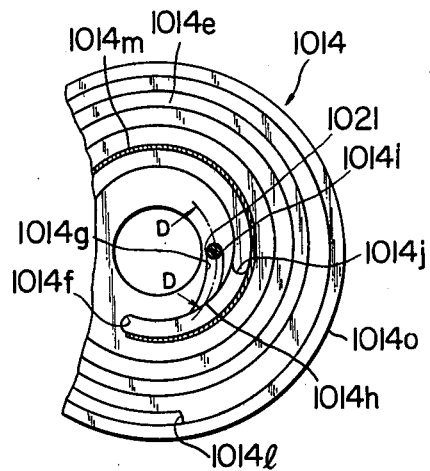
Figures 1B, 11:
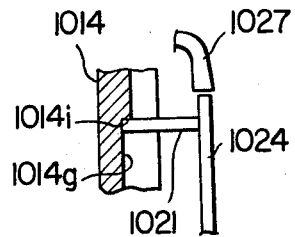
Figures 2A, 11:
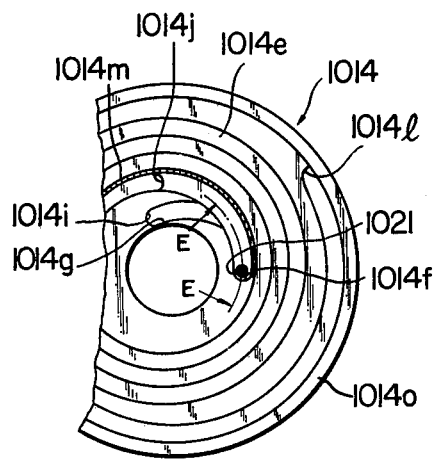
Figures 2B, 11:
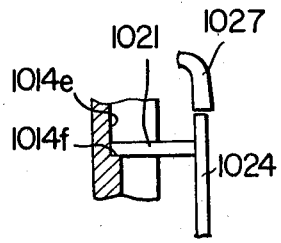
Figures 3A, 11:
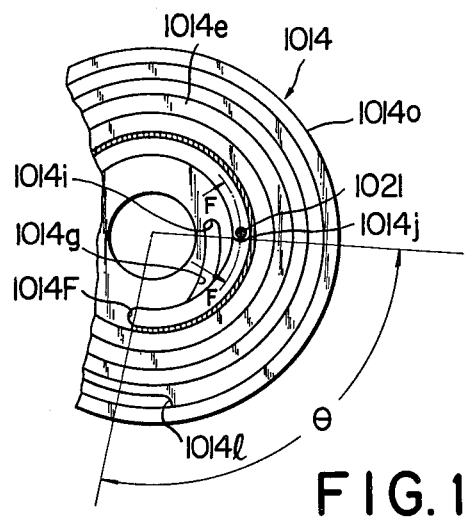
Figures 3B, 11:
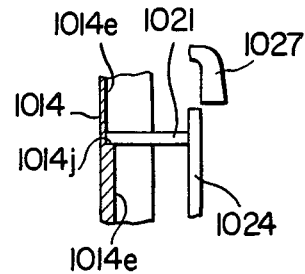

Next, with reference to FIGS. 11-1(A) and (B), when the belt is reeled out from the spool to be fastened by the driver or the passenger, guide disk 1014 rotates clockwise in frictional contact with second flange 4 having ratchet teeth 4b. In this case, however, since follower rod 1021 is engaged with or caught by inner end 1014i of reverse-direction follower guide portion 1014g within one revolution (the dotted circle denotes the movement of follower rod assuming the guide disk to be fixed) guide disk 1014 cannot rotate further in the direction in which the seat belt is further reeled out; therefore, the belt is thereafter reeled out under sliding contact between ratchet teeth 4b and guide disk 1014 with clutch plate 1040 and cam ring 1032 sandwiched therebetween.

With reference to FIGS. 11-2(A) and (B), when the belt is reeled out sufficiently and a tongue (not shown) is engaged with a buckle (not shown) after the driver has taken an appropriate sitting position, the belt is slightly retracted by the force of spool spring 9. Therefore, spool 3 and guide disk 1014 rotate together in counterclockwise direction due to frictional contact therebetween. Follower rod 1021 then advances in reverse direction follower-guide portion 1014g toward the intersection with spiral follower-guide portion 1014e as shown by the dotted line, and drops from stage portion 1014h to spiral follower-guide portion 1014e. Follower rod 1021 next reaches inner end 1014f of the spiral follower-guide portion. In this case, although follower 1020 is urged upward by the guide disk, since follower plate 1024 is brought into contact with stopper 1027, guide disk 1014 cannot rotate in the direction in which the belt is further retracted. Accordingly, thereafter, the belt is retracted under a sliding contact condition between guide disk 1014 and spool 3 until the seat belt is brought closely into contact with the driver's body. In this state, tension is applied to the driver.

With reference to FIGS. 11-3(A) and (B), when the driver moves, the belt reels out slightly, causing guide disk 1014 to rotate clockwise and follower rod 1021 move within spiral follower-guide portion 1014e. Rod 1021 passes through the crossing with reverse-direction follower-guide portion 1014g and reaches the spool-locking portion 1014j (in this case, follower 1020 cannot move from spiral follower-guide portion 1014e to reverse-direction follower-guide portion 1014g because of stage 1014h, i.e., the height difference between the two).

As depicted in FIG. 11-3(B), follower rod 1021 drops into spool-locking portion 1014j due to the force of conical spring 1025. Follower plate 1024 moves toward the center of the guide disk to disengage from stopper 1027. Since follower 1020 is freed from stopper 1027, the follower moves upward together with guide disk 1014 so that arm portion 1022 of the follower pushes pawl 1017 upward to engage it with a ratchet tooth 4b. Since the force from spool spring 9 is applied to clutch plate 1015, the clutch plate also rotates counterclockwise, causing lock pawl 1028 rotate clockwise because first projection 1028a engages with the bifurcated projection 1016. Accordingly, second projection 1028b of lock pawl 1028 engages ratchet tooth 4b so that spool 3 cannot rotate in the direction in which the belt is further retracted, thus realizing a more reliable tensionless condition. Further, in this case, the belt has some slack (a tensionless length) commensurate with an angle θ from the inner end 1014f of the spiral follower-guide portion 1014e to the spool-locking portion 1014j.

When the driver of passenger fastening the seat belt leans forward for some reason, since the guide disk 1014 is rotated clockwise together with ratchet teeth 4b, follower rod 1021 moves up along slope 1014k of the follower guide portion 1014e for up to several revolutions of the guide disk 1014.

In this case, spool 3 can rotate clockwise because ratchet teeth 4b can move over pawl 1017 and lock pawl 1028 due to the orientation of the ratchet teeth.

When the driver or passenger returns from the forward position to the normal sitting position, the belt is retracted again, causing follower rod 1021 to return back along spiral follower-guide portion 1014e and drop into spool-locking portion 1014j, thus realizing a tensionless condition again. During this period, since guide disk 1014 cannot slide across second flange 4, the belt is not further retracted, thus maintaining the tensionless length preset under the initial tensionless condition.

Figures 1, 12:
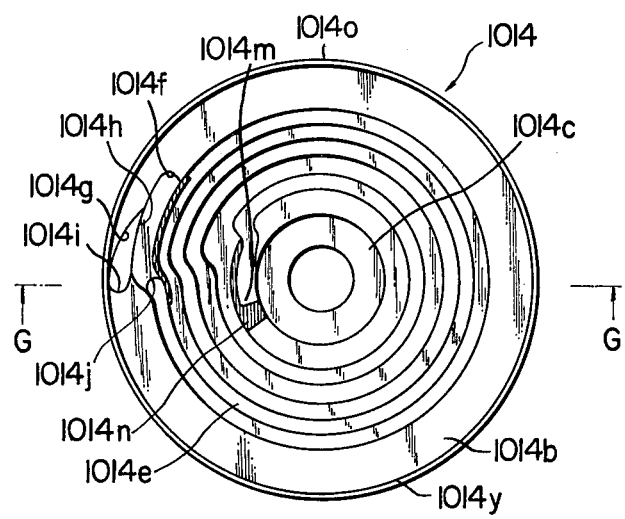
Figures 2, 12:
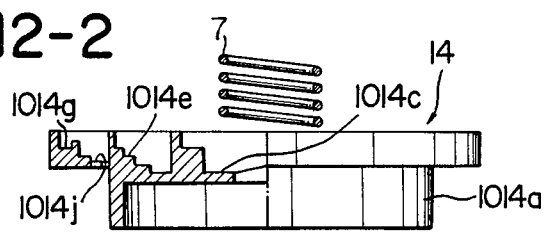
Figures 1, 13:
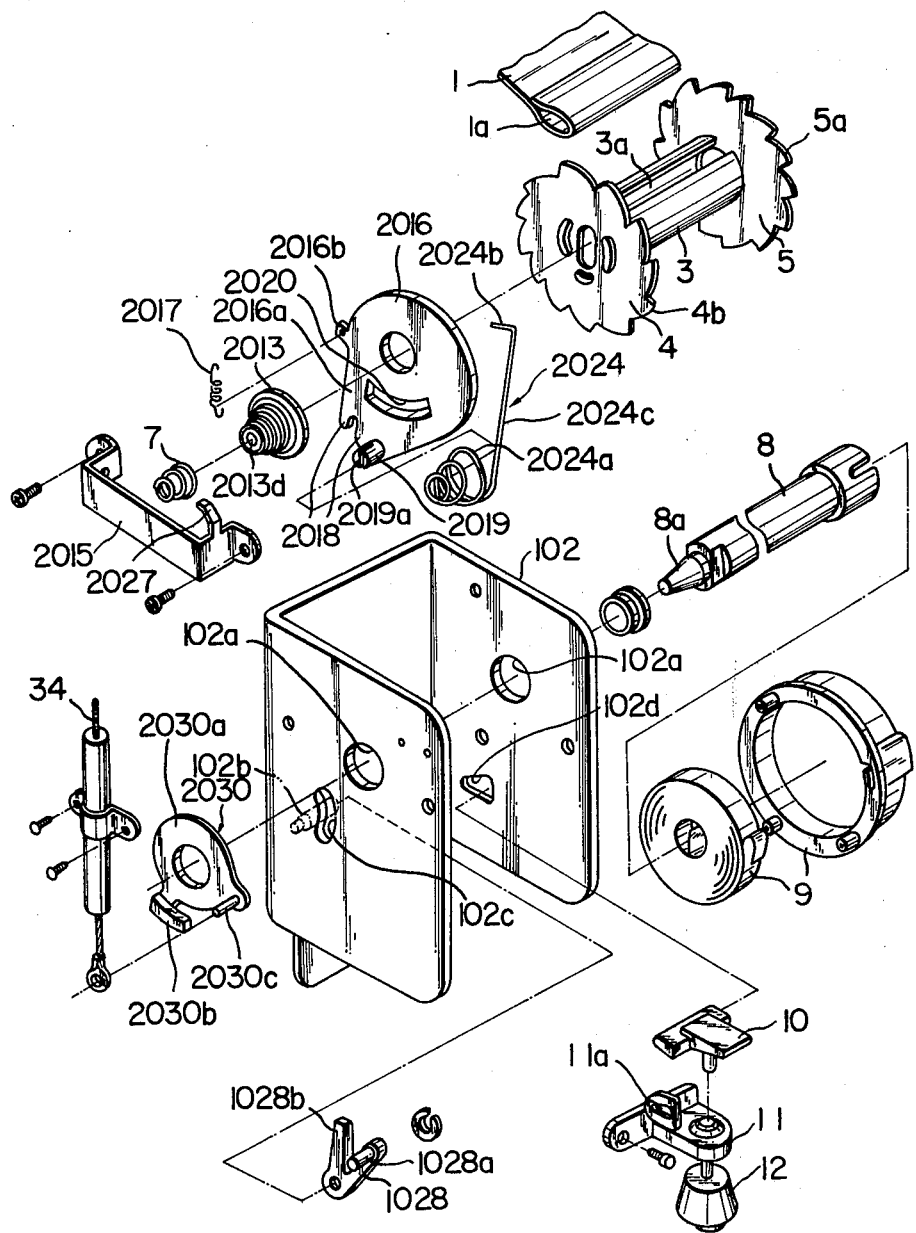
Figures 2, 13:
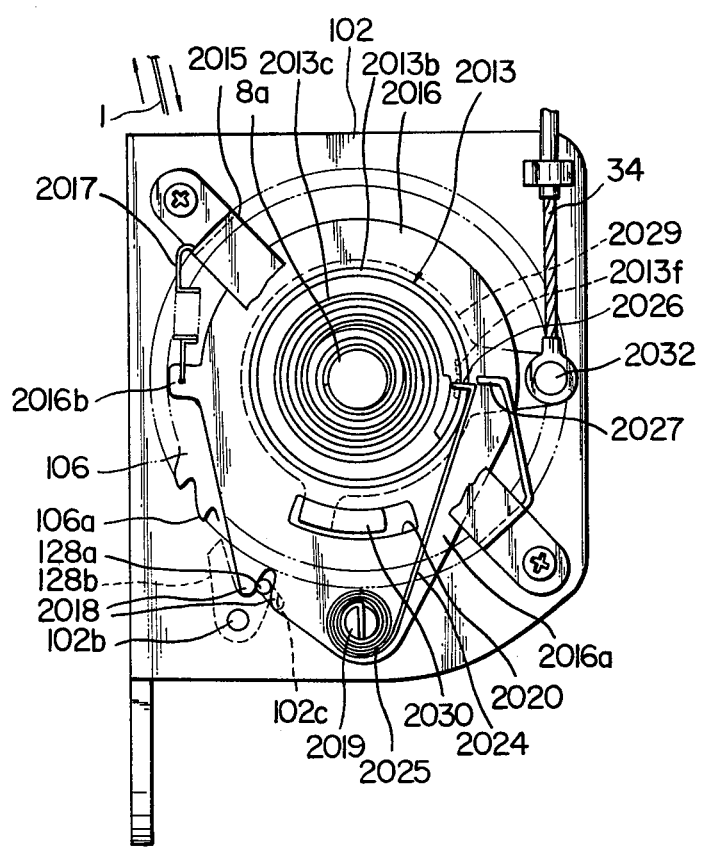
Figures 3, 13:
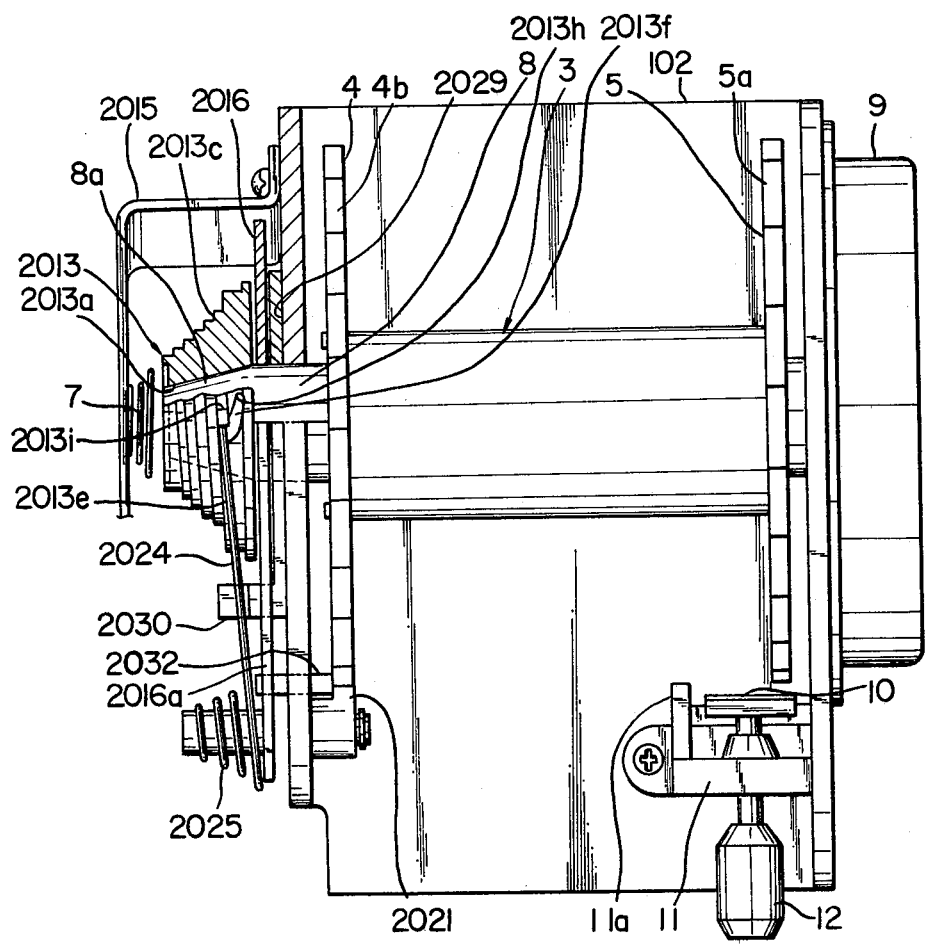

FIGS. 12-1 and 12-2 show an eighth embodiment of the seat belt retractor according to the present invention. The main difference from the foregoing embodiments is that the function served by the center portion of the guide disk is served on the peripheral side thereof; that is, the relation between the inner end and the outer end is reversed. In this embodiment, of course, the direction in which the follower is urged is radially outward. In more detail, the circular-arc reverse-direction follower-guide portion 1014g and inner end 1014i of spiral follower-guide portion 1014e are formed on the outermost circumferential edge, and top 1014n with slope 1014m is formed on the innermost circumferential end of the spiral follower-guide portion. Therefore, the through hole or the spool-locking portion 1014j is located near the outermost circumferential edge. Further, when released, the follower rod returns to the original set position 1014b. In this embodiment, an outer peripheral wall 1014y is formed on the outermost edge of the guide disk to ensure proper positioning of follower pin 1021 in the original position.

Next, there is described a ninth embodiment of the seat belt retractor according to the present invention with reference to FIGS. 13-1, 13-2, 13-3, and FIGS. 14-1(A) to 14-4(B).

A conical guide disk 2013 is rotatably supported by a conical portion 8a of spool shaft 8 inserted into two shaft holes 102a formed in frame 102. Conical guide disk 2013 is urged against conical portion 8a by helical spring 7 disposed between a bridge member 2015 fixed on the side wall of frame 102 and guide disk 2013. Guide disk 2013 can rotate with spool 3 in frictional contact therewith.

Figures 1A, 1B, 14:
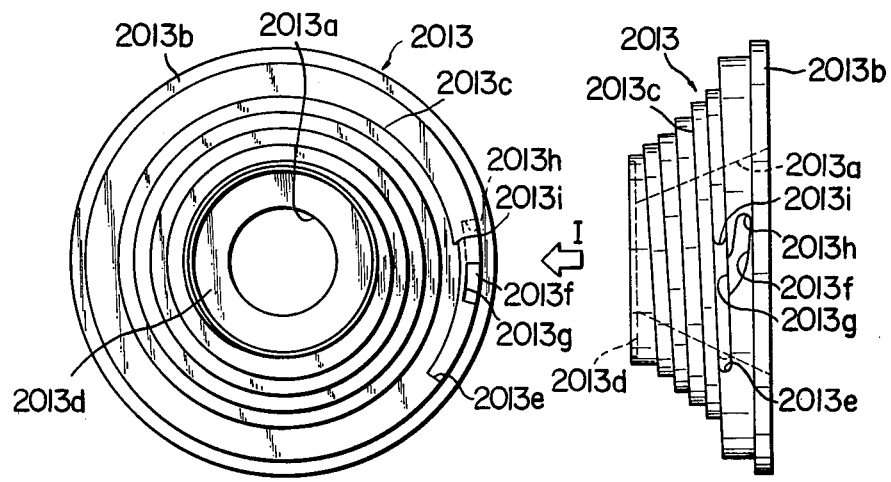
Figures 2A, 2B, 14:
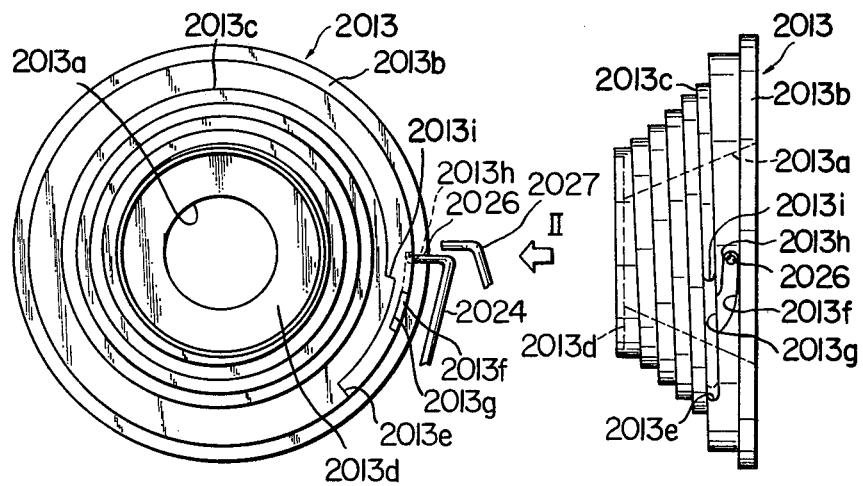
Figures 3A, 14:
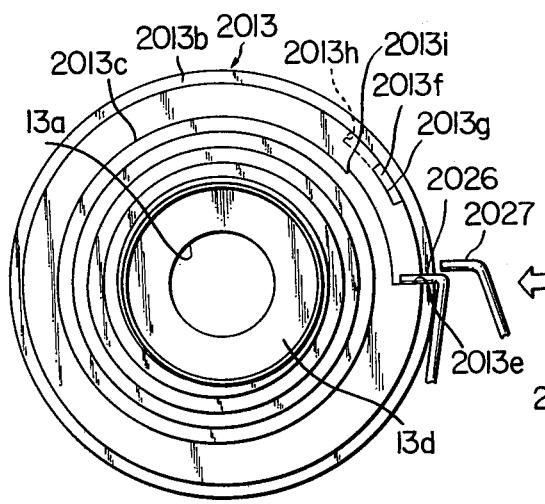
Figures 3B, 14:
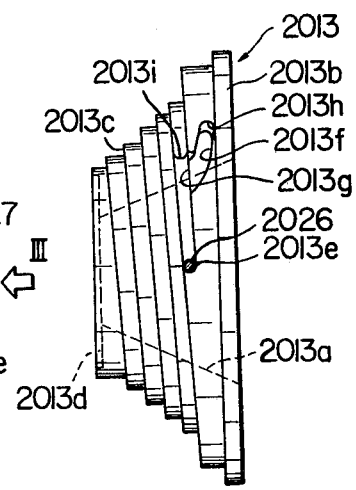
Figures 4A, 14:
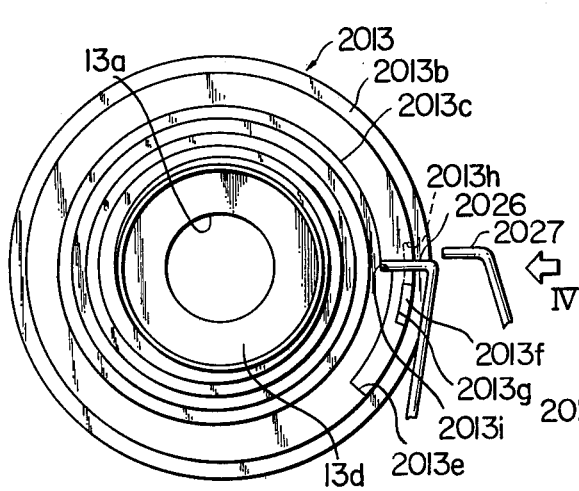
Figures 4B, 14:
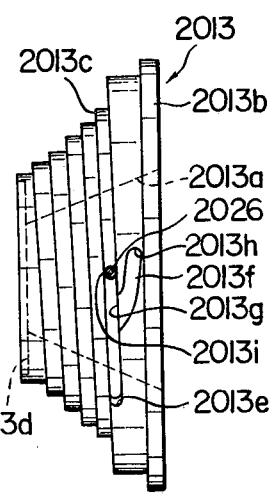

Beginning from the outer periphery of conical guide disk 2013, there is provided a stepped counterclockwise several-turn spiral follower guide portion 2013c. A spring seat 2013d for spring 2014 is formed on top thereof. In addition, a circular-arc reverse-direction follower-guide portion 2013f extends axially inwards and counterclockwise beginning from near outer end 2013e of spiral follower-guide portion 2013c. A stage 2013g is provided at the intersection of reverse-direction follower-guide portion 2013f with spiral follower-guide portion 2013c. Further, in this embodiment, end 2013h of reverse-direction follower-guide portion 2013f is located axially inward (conically lower) from outer end 2013e of spiral follower-guide portion 2013c, as depicted in FIG. 14-1(B). As depicted in FIGS. 14-2(A) and (B), a spool-locking portion 2013i is formed in spiral follower-guide portion 2013c slightly radially-inward from the intersection of reverse-direction follower-guide portion 2013f with spiral follower guide portion 2013c.

A clutch plate 2016 is rotatably fitted to spool shaft 8 between second flange 4 and guide disk 2013 and is urged clockwise by a clutch plate spring 2017 held between a lug 2016b formed in the clutch plate and one edge of bridge 2015. Clutch plate 2016 includes a bifurcated projection 2018 with which the lock pawl can engage, a pin 2019 for anchoring follower 2024, and an arcuate slot 2020 through which arm 2030b of release lever 2030 posses.

The lock pawl 1028 rotatably supported by a pin 102b fixed on the inside wall of frame 102 has a pin 1028a (first projection) engageable with bifurcated projection 2018 formed in clutch plate 2016 and an integrally formed second projection 1028b engagable with ratchet teeth 4b. Pin 1028a passes through an arcuate slot 102c formed in the side wall of frame 102 to engage with bifurcated projection 2018.

Being preferably made of steel rod, follower 2024 includes a conical spring portion 2024a and a follower end 2024b bent at end of a straight portion 2024c. The Follower 2024 is fitted on pin 2019 fixed on clutch plate 2016 with the end portion of conical spring portion 2024a fitted to a slot 2019a formed in the pin. The follower 2024 is urged toward the center of guide disk 2013 and toward the bottom side of the conical guide disk by the force of conical spring portion 2024a, and moves with pin 2019 as clutch plate 2016 rotates.

Stopper 2027 is formed extending from one side portion of a bridge 2015 and serves to stop the upward movement from outer end 2013e of spiral follower-guide portion 2013c of follower 2024 when follower end 2024b contacts the end of the stopper and before the follower end drops into spool-locking portion 2013i. However, after the follower end drops into the spool-locking portion, since the follower end is offset radially inward from stopper 2027, it can move upward as the clutch plate 2016 rotates.

The follower release means 2030 includes a ring portion 2030a rotatably supported by shaft 8, an arm portion 2030b to push follower 2024 to disengage same from guide disk 2013, and a pin 2030c to which a release cable 34 is attached.

Now follows a description of operation of the ninth embodiment of the seat belt retractor according to the present invention.

As depicted in FIGS. 14-4(A) and (B), when the driver moves slightly forward, causing slight reeling out of the belt conical guide disk 2013 rotates clockwise follower end 2024b moves along spiral follower-guide portion 2013c, passing through the intersection with the reverse-direction follower guide portion 2013f, and reaches spool-locking portion 2013i. Therefore, the follower end 2024b is disengaged from stopper 2027; the follower 2024 moves upward together with cam plate 2016 so that bifurcated projection 2018 rotates counterclockwise to rotate lock pawl 1028 clockwise. Accordingly, second projection 1028b of lock pawl 1028 engages with a ratchet tooth 4b so that spool 3 cannot rotate in the direction in which the belt is further retracted, thus realizing a more reliable tensionless condition.

Figure 15:
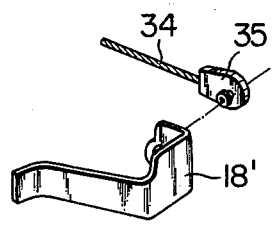
FIG. 15 is a perspective view of the other embodiment of the driven-member releasing means used with the seat belt retractor according to the present invention.

FIG. 15 shows a tenth embodiment of the seat belt retractor according to the present invention. The main difference from the first embodiment is that a cable 34 of the type which is used to transmit force both in tension and in compression is used in place of the magnet. That is to say, one end of the cable 34 is connected to a follower-release gate 18' through a connecting lug 35, and the other end of the cable is connected to the door, so that the follower 13 can be released when the door is opened.

Figure 16:
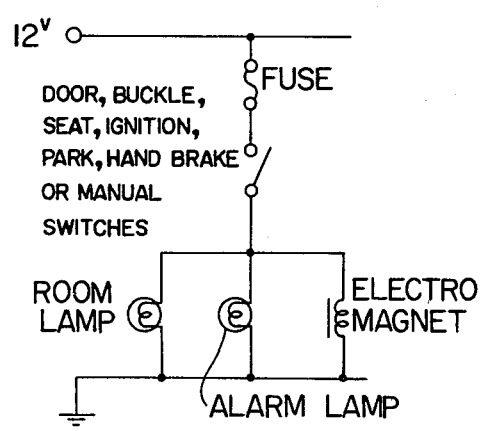
FIG. 16 is a circuit diagram used for the seat belt retractor according to the present invention.

FIG. 16 is a circuit diagram of the seat belt retractor where the magnet 16 in FIG. 1 is used. In this case, a door switch is turned on only while the door is open in order to light up the room lamp and the opened-door alarm lamp and to energize the magnet 16.

In addition to the above-mentioned embodiments, it is possible to realize various embodiments of the seat belt retractor according to the present invention as follows:

(1) Although the follower is released when the door is opened, it is possible to release the follower when the buckle engages the tongue, when the ignition switch is turned on or off, when the gear shift lever is moved to the Park position, when the hand brake is engaged or disengaged, when driver or passenger weight is detected on the seat cushion, when a passive seat belt system is driven, when an electromagnetic means such as magnet or solenoid is energized with a manual switch, when a mechanical means such as a wire or link mechanism is used to release the follower, or when the belt is reeled out beyond a predetermined length.

(2) In the case where the follower-release means is actuated when the buckle and the tongue are disengaged, it is possible to omit the reverse-direction guide portion under the condition that the belt will not be further reeled out after the buckle and the tongue have been engaged with each other. In this case, it is necessary that the inner end of the spiral follower-guide portion reaches the inner edge of the guide plate.

(3) A stage is formed in the spiral follower-guide portion in the embodiments already described above; however, if the follower-guide portion is separated from other places by a wall, it is possible to use a follower guide portion formed in a flat surface.

(4) If the belt is not reeled out extraordinarily after the tensionless length has been set, the top with a slope is not required on the innermost or outermost end of the spiral follower-guide portion.

In short, the seat belt retractor according to the present invention has the following features;

(1) Since a tensionless length (slack in the belt) is determined by reeling out the belt by a predetermined length after the belt is fastened by the driver or the passenger and the belt is once retracted, there is no excessive slack in the seat belt, thus providing a safe seat belt.

(2) Since the tensionless length can approximately be determined by an angle $\theta$ subtended by the spool locking portion and the inner end of the spiral follower-guide portion, it is possible to accurately provide a sufficient tensionless length.

(3) Since the tensionless length once set is not released by the normal range of forward movement of the driver, it is possible to realize a tensionless condition whenever the driver returns to the normal sitting position.

As described hereinabove, in the seat belt retractor according to the present invention, since a tensionless condition can be achieved by providing a predetermined amount of slack in the seat belt, it is possible to provide appropriate slack to the driver or the passenger while maintaining harness safety.

Further, since the predetermined belt length will not be changed by the movement of the driver, it is always possible to achieve a safe, tensionless condition whenever the driver or the passenger return to a normal sitting position.

Furthermore, since the number of necessary parts is small and the structure is easy to assemble, it is possible to realize a low-priced, small-sized, lightweight seat belt retractor.

It will be understood by those skilled in the art that the foregoing description is in terms of preferred embodiments of the present invention wherein various changes and modifications may be made without departing from the spirit and scope of the invention, as is set forth in the appended claims.

What is claimed is:

1. A seat belt retractor for an automotive vehicle comprising:
  (a) a frame;
  (b) a spool onto which a seat belt is wound, having a first flange with a first spool-locking means and a second flange with a second spool-locking means, said spool being rotatably supported within said frame;
  (c) a spool spring for urging said spool in the direction of retraction of the seat belt;
  (d) an emergency spool-locking mechanism responsive to abrupt deceleration of the vehicle to prevent the spool from rotating in the direction of reeling out the seat belt in conjunction with said first spool-locking means;
  (e) a follower for preventing said spool from rotating in the retracting direction of the seat belt in conjunction with said second spool-locking means;
  (f) a follower release means for disengaging said follower from said second spool-locking means in response to a signal for retracting the seat belt; and
  (g) a guide disk rotatably supported concentrically with said second flange and said second spool-locking means and urged against said second flange so that said guide disk rotates with said spool due to frictional coupling, for controlling the position of said follower in response to rotation of the spool, a side of said guide disk facing away from said second flange being formed with:
    an original position area towards which said follower is urged and to which said follower moves when said follower is disengaged from said second spool-locking means by said follower-release means;
    a reverse-direction follower-guide portion having an inner edge formed in proximity to the original position area such that when said guide disk rotates in the direction of reeling out the seat belt said follower enters the reverse-direction follower guide portion and is caught by the inner edge within one revolution of the guide disk to prevent said guide disk from further rotation in the direction of reeling out the seat belt and to allow said second flange of said spool to rotate with respect to the guide disk in sliding contact therewith;
    a several-turn spiral follower-guide portion connected to the reverse-direction follower-guide portion so that said follower enters the several-turn spiral follower-guide portion from the reverse-direction follower-guide portion when said guide disk rotates in the direction of retracting the seat belt, the several-turn spiral follower guide portion extending spirally for several turns of the guide disk in the direction of retracting the seat belt so that said follower moves along the several-turn spiral follower-guide portion as the guide disk rotates in the direction of reeling out the seat belt; and
    a spool-locking portion formed in the several-turn spiral follower-guide portion for moving said follower into engagement with said second spool-locking means,
    whereby when the seat belt initially reels out, the follower enters the reverse-direction follower-guide portion and is caught by the inner edge thereof, and then when the seat belt is retracted, the follower enters the several-turn spiral follower-guide portion so that when the seat belt reels out again, the follower moves into engagement with said second spool-locking means through said spool-locking hole, thereby preventing retracting tension from being applied to the seat belt until the follower-release means is operated.

2. The seat belt retractor of claim 1, wherein said original position area of said guide disk is near the center of said guide disk, and the reverse-direction and several-turn spiral follower-guide portions extend radially outwards in addition to extending circumferentially.

3. The seat belt retractor of claim 1, wherein said second spool-locking means includes a set of ratchet pawls projecting from a surface of said second flange facing said guide disk, and the spool-locking portion of said guide disk includes a hole through which said follower can extend to engage one of the ratchet pawls.

4. The seat belt retractor of claim 1, further comprising a top portion provided at the end of the several-turn spiral follower-guide portion opposite the original position area of said guide disk for returning said follower to the original position area when said follower moves along the several-turn spiral follower-guide portion for more than several turns of said guide disk.

5. The seat belt retractor of claim 1, further comprising a stage provided on said guide disk at the intersection of the reverse-direction and several-turn spiral follower-guide portions so that the follower cannot move from the several-turn spiral follower-guide portion to the reverse-direction follower-guide portion.

6. The seat belt retractor of claim 1, wherein said follower comprises a resilient steel rod having:
   (a) a follower end portion engageable with said guide disk and being moved thereby;
   (b) a straight portion to which said follower end portion is attached; and
   (b) a spring portion fixed to the frame and attached to the straight portion for urging said follower end portion toward the original position area of said guide disk.

7. The seat belt retractor of claim 1, further comprising a tensionless means responsive to said follower for preventing said spool from rotating in the direction of retracting the seat belt in conjunction with said second spool-locking means.

8. The seat belt retractor of claim 7, wherein said tensionless means comprises a clutch plate rotatably supported along the same axis as the guide disk, responsive to said follower to pivot in a first direction when said follower enters the spool-locking portion of said guide disk and said guide disk rotates further in the direction of reeling out the seat belt, and urged in a second direction opposite the first direction, and a lock pawl responsive to said clutch plate to prevent said spool from rotating in the direction of retracting the seat belt in conjunction with said second spool-locking means when said clutch plate pivots in the first direction.

9. The seat belt retractor of claim 1, wherein the original position area of said guide disk is near the periphery of said guide disk, and the reverse-direction-and several-turn spiral follower-guide portions extend radially inwards in addition to their respective angular directions.

10. The seat belt retractor of claim 1, further comprising a friction-enhancing member, made of a material with a high coefficient of friction, disposed between said guide disk and said second flange.

11. The seat belt retractor of claim 7, wherein said second spool-locking means comprises a set of ratchet teeth disposed around the periphery of said second flange.

12. The seat belt retractor of claim 8, wherein said follower comprises:
   (a) a follower rod for contacting said guide disk and being moved thereby;
   (b) a plate to which the follower rod is attached, pivotally attached to said clutch plate; and
   (c) a spring attached at one end to said clutch plate and at the other to the plate for urging the follower rod toward the original position area.

13. The seat belt retractor of claim 1, wherein said follower release means comprises:
   (a) a lever disposed between said follower and said guide disk and pivotably supported by said frame so as to be pivotable between a position separating said follower from said guide disk and a position permitting contact therebetween; and
   (b) means for actuating the lever, responsive to the signal for retracting the seat belt to move the lever to the position separating said follower and said guide disk.

14. The seat belt retractor of claim 13, wherein the actuating means comprises an electromagnet energizable by the signal for retracting the seat belt and positioned near an end of the lever so as to move the lever to the position separating said follower and said guide disk in response to the signal for retracting the seat belt, and a spring disposed between the electromagnet and the lever for urging the lever toward the position permitting contact between said follower and said guide disk.

15. The seat belt retractor of claim 13, wherein the actuating means is a mechanical linkage responsive to the signal for retracting the seat belt to apply a force to the level in order to move the lever between the positions of separating and permitting contact between said follower and said guide disk.

16. The seat belt retractor of claim 15, wherein the lever is in the shape of an air foil having an arm rotatably supported by said frame and connected to the mechanical linkage.

17. The seat belt retractor of claim 15, wherein the lever has a cam surface and is pivotably supported by said frame so as to be pivotable between a first position in which the cam surface separates said follower and said guide disk and a second position in which said follower and said guide disk are in contact.

18. The seat belt retractor of claim 17, wherein the mechanical linkage comprises:
   (a) a spring for urging the lever toward the second position; and
   (b) a cable attached to the lever and responsive to the signal for retracting the seat belt to move the lever to the first position against the force of the spring.

19. The seat belt retractor of claim 17, wherein the mechanical linkage comprises a cable attached to the lever and responsive to the signal for retracting the seat belt to move the lever to the first position, and which linkage returns the lever to the second position when the signal for retracting the seat belt is absent.

20. The seat belt retractor of claim 12, wherein said clutch plate further comprises a clutch plate pawl reciprocable between a first position in engagement with said second spool-locking means and a second position out of engagement therewith, and said follower further comprises an arm positioned so as to move the clutch plate pawl toward the first position when the follower rod is in the spool-locking portion of said guide disk, and said follower-release means includes at least a cam portion pivotably supported adjacent to said clutch plate, having a cam profile, and responsive to the signal for retracting the seat belt to pivot with respect to the clutch plate such that the cam profile moves the clutch plate pawl toward the second position.

21. The seat belt retractor of claim 1, wherein the signal for retracting the seat belt is produced by a seat belt buckle switch of the vehicle whenever the seat belt buckle is unfastened.

22. The seat belt retractor of claim 1, wherein the signal for retracting the seat belt is produced whenever the gear shift lever of the vehicle is moved to the park position.

23. The seat belt retractor of claim 1, wherein the signal for retracting the seat belt is produced when the hand brake of the vehicle is engaged.

24. The seat belt retractor of claim 1, wherein the signal for retracting the seat belt is produced when the ignition switch of the vehicle is turned off.

25. The seat belt retractor of claim 1, wherein the signal for retracting the seat belt is produced when the absence of weight is detected in the vehicle seat.

26. The seat belt retractor of claim 1, wherein the signal for retracting the seat belt is produced when a manual switch is actuated.

27. The seat belt retractor of claim 1, wherein the signal for retracting the seat belt is produced when a vehicle door is opened.

* * * * *